United States Patent [19]

Iwano et al.

[11] Patent Number: 5,404,416
[45] Date of Patent: Apr. 4, 1995

[54] OPTICAL CONNECTOR PLUG

[75] Inventors: Shinichi Iwano; Ryo Nagase, both of Ibaraki; Kazunori Kanayama, Tokyo; Etsuji Sugita, Tokyo; Yasuhiro Ando, Tokyo, all of Japan

[73] Assignee: Nippon Telegraph & Telephone Corporation, Japan

[21] Appl. No.: 22,391

[22] Filed: Feb. 24, 1993

Related U.S. Application Data

[60] Continuation of Ser. No. 773,212, Oct. 9, 1991, abandoned, Division of Ser. No. 616,981, Nov. 21, 1990, Pat. No. 5,121,454.

[51] Int. Cl.$^6$ .............................................. G02B 6/36
[52] U.S. Cl. .......................................... 385/60; 385/78
[58] Field of Search ..................................... 385/60–68, 385/70–72, 78–85

[56] References Cited

U.S. PATENT DOCUMENTS

| 4,541,685 | 9/1985 | Anderson | 385/72 |
| 4,548,467 | 10/1985 | Stoerk et al. | 385/65 |
| 4,611,887 | 9/1986 | Glover et al. | 385/72 |
| 4,759,599 | 7/1988 | Yamaguchi et al. | 385/60 |
| 4,850,670 | 7/1989 | Mathis et al. | 385/72 |
| 4,892,379 | 9/1990 | Takeda et al. | 385/60 |
| 4,895,425 | 6/1990 | Iwano et al. | 385/60 |
| 5,016,970 | 5/1991 | Nagase et al. | 385/60 |
| 5,121,454 | 6/1992 | Iwano et al. | 385/60 |
| 5,157,749 | 10/1992 | Briggs et al. | 385/60 |

FOREIGN PATENT DOCUMENTS

| 0119013 | 9/1984 | European Pat. Off. | H01R 13/627 |
| 0156608 | 10/1985 | European Pat. Off. | G02B 6/38 |
| 0223608 | 5/1987 | European Pat. Off. | G02B 6/38 |
| 0228063 | 7/1987 | European Pat. Off. | G02B 6/38 |
| 0307518 | 3/1989 | European Pat. Off. | G02B 6/38 |
| 0330231 | 8/1989 | European Pat. Off. | H01R 13/631 |
| 0339876 | 11/1989 | European Pat. Off. | G02B 6/38 |

OTHER PUBLICATIONS

Review of the Electrical Communications Laboratories, vol. 35, No. 5, Sep. 1987, "High Performance Push–Pull Coupling Single Fiber Connectors and Plug–In Fiber-Optic Connectors", pp. 529–533, Sugita, Shintaku and Sasakura.

Primary Examiner—Frank Gonzalez
Attorney, Agent, or Firm—Wigman, Cohen, Leitner & Myers

[57] ABSTRACT

To provide an optical connector which can slidably and stably support the optical connector element (ferrule) within the connector housing without increasing the axial length of the ferrule, the optical connector plug comprising: (a) a plug housing (202) formed with a shoulder portion (253) between a large hollow portion (254) and a small hollow portion (252) and formed with no projection between said two portions; (b) a plug ferrule (201) connected to an optical fiber (204) and formed with a flange portion (201b) slidably fitted into the large hollow portion of said plug housing and an end portion (201a) passed through the small hollow portion of said plug housing; and (c) a spring (203) housed within said plug housing to urge the flange portion of said plug ferrule against the shoulder portion (253) of said plug housing. A mated jack ferrule (201) is fitted to the small hollow portion (252) of said plug housing (202) via a sleeve holder (206) having a floating slit sleeve (205) therewithin so as to absorb an axial dimensional fitting error between the plug ferrule and the jack ferrule by axially urging the flange portion (201b) of said plug ferrule by an inner end of the sleeve holder (206) against said spring (203).

4 Claims, 45 Drawing Sheets

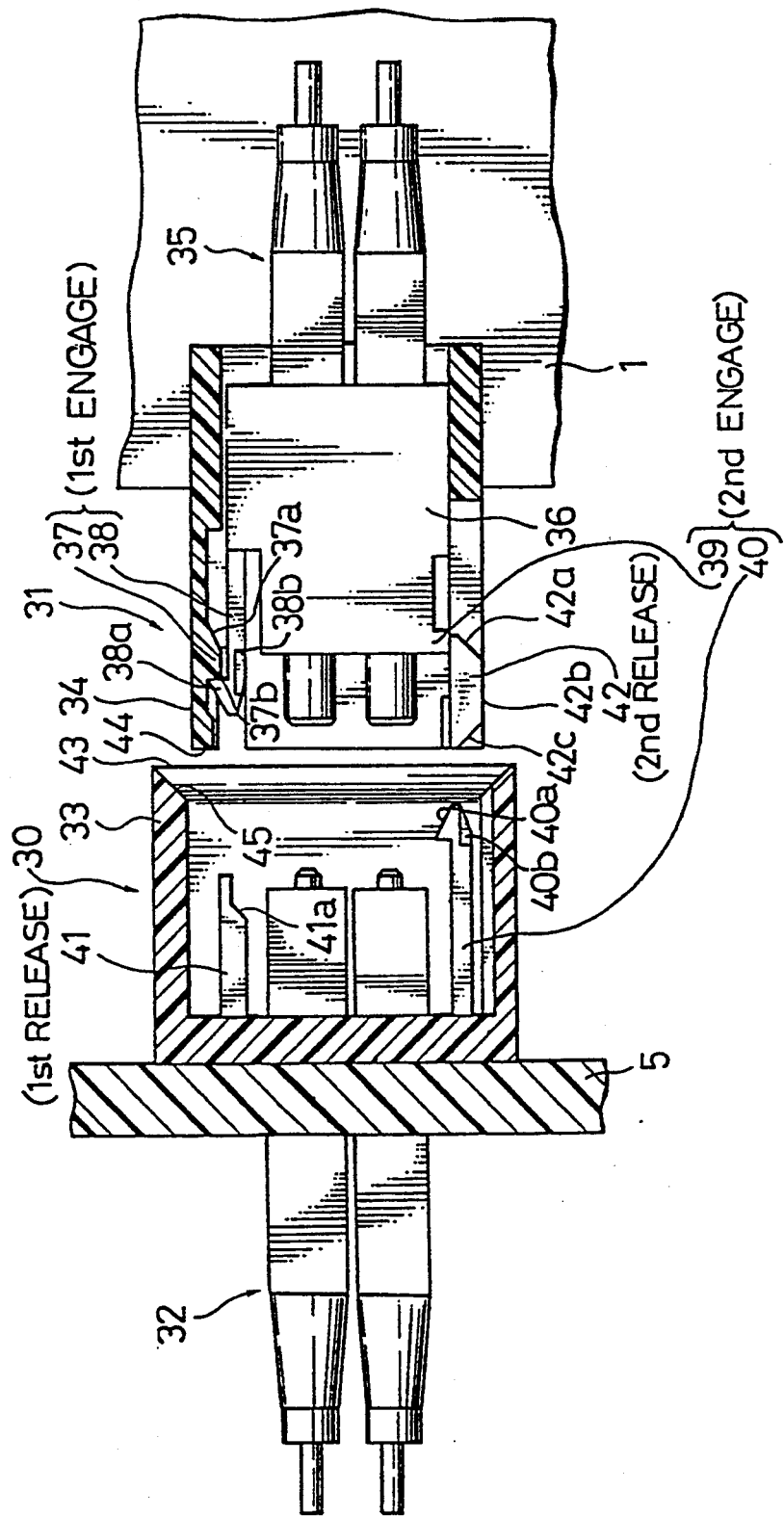

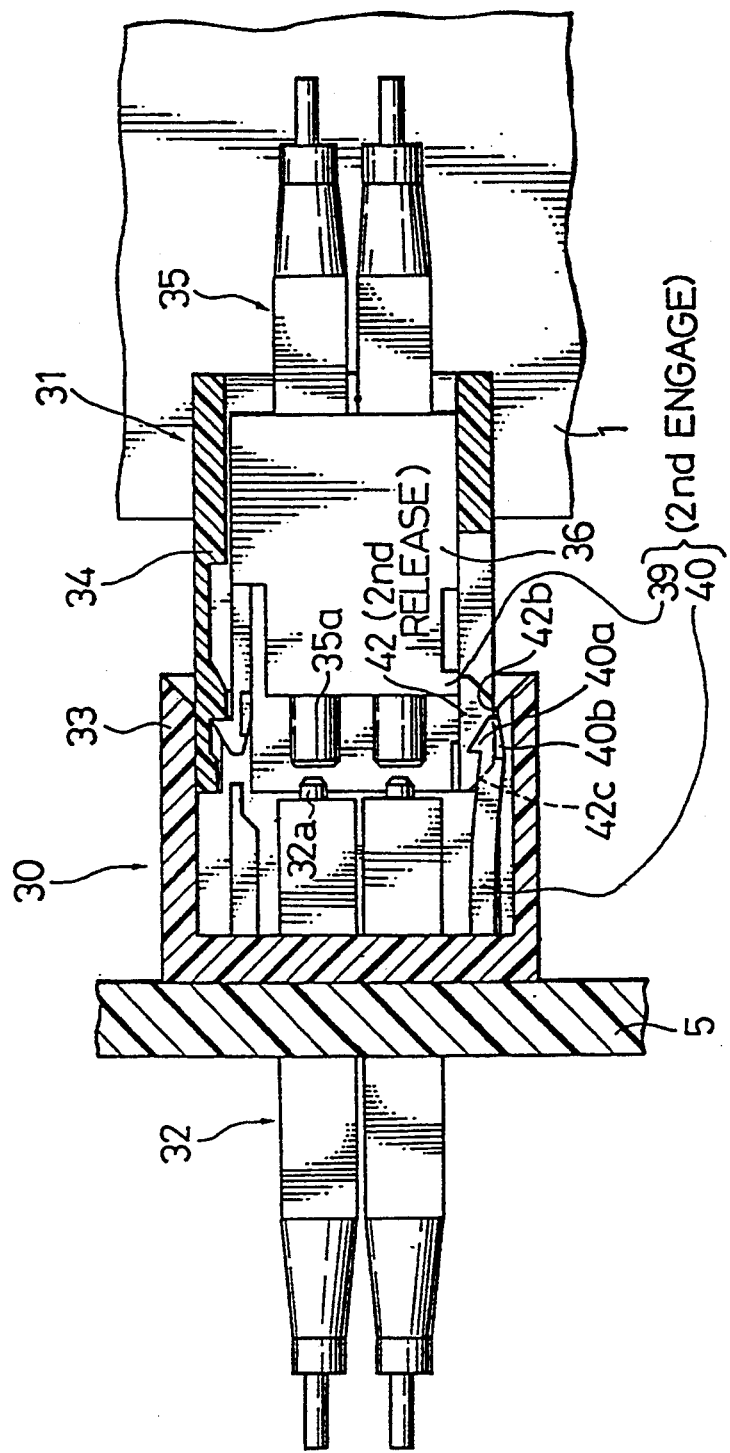

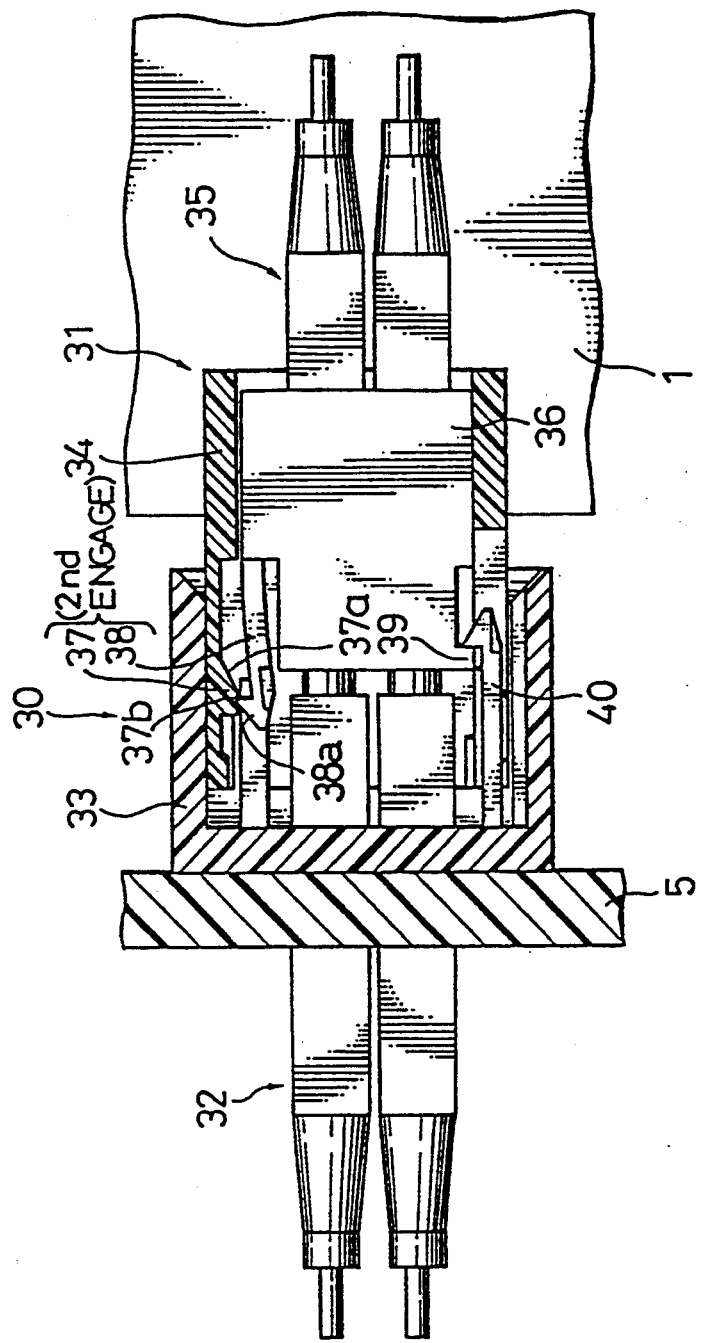
FIG.3(g) DISENGAGEMENT START

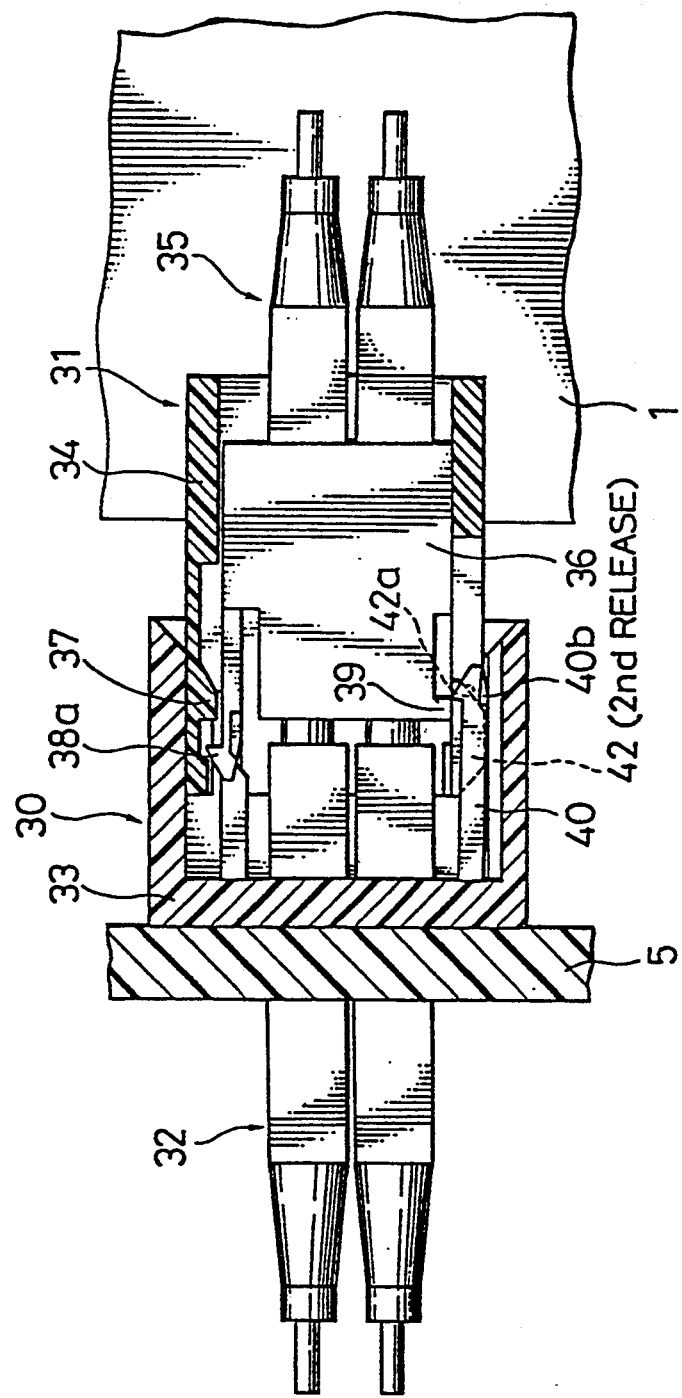

FIG.9(a)
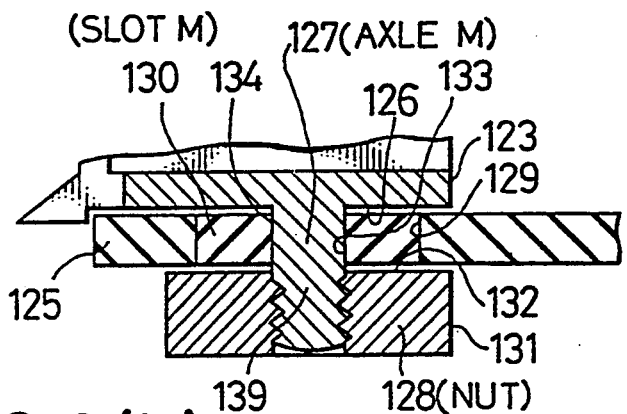
FIG.9(b)
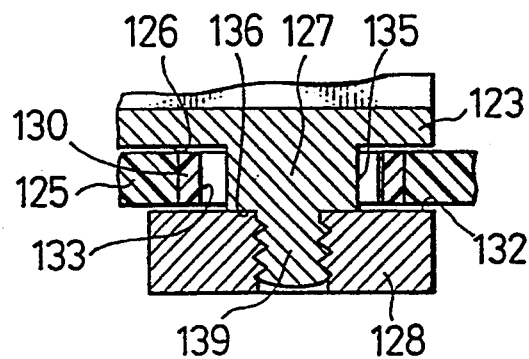
FIG.10(b)    FIG.10(a)
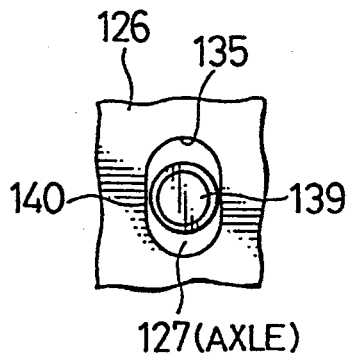
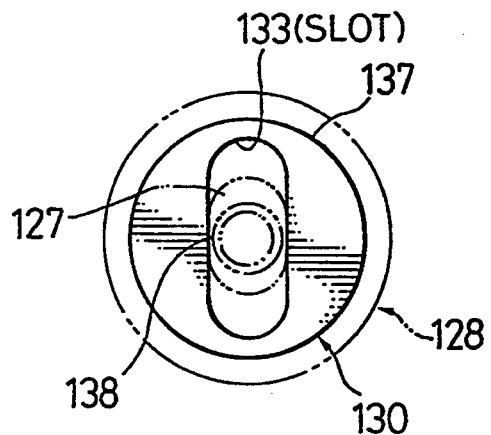

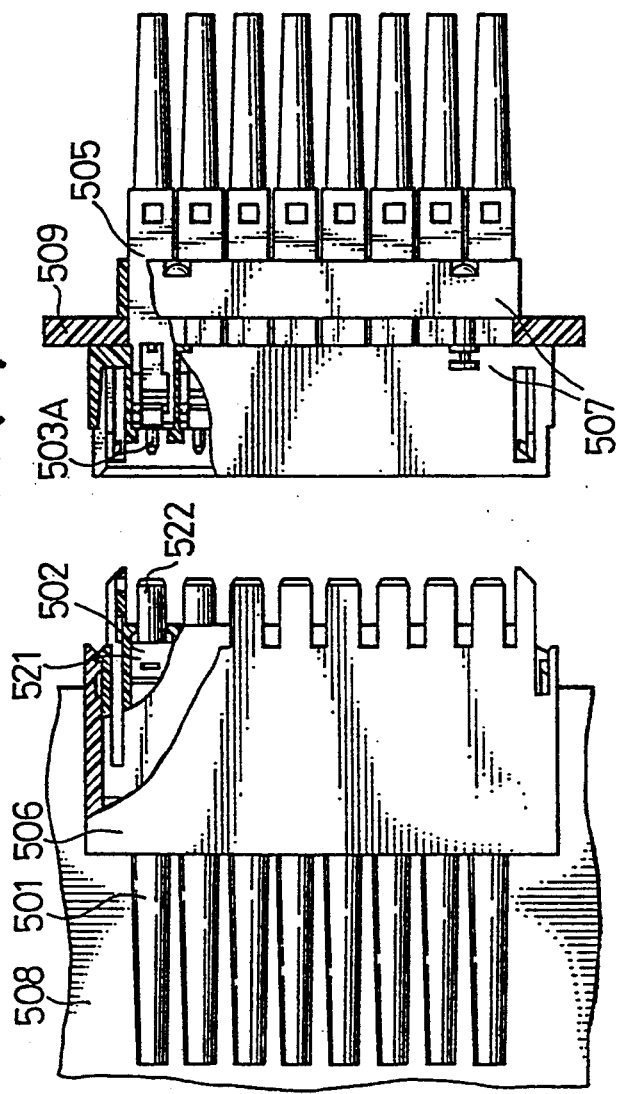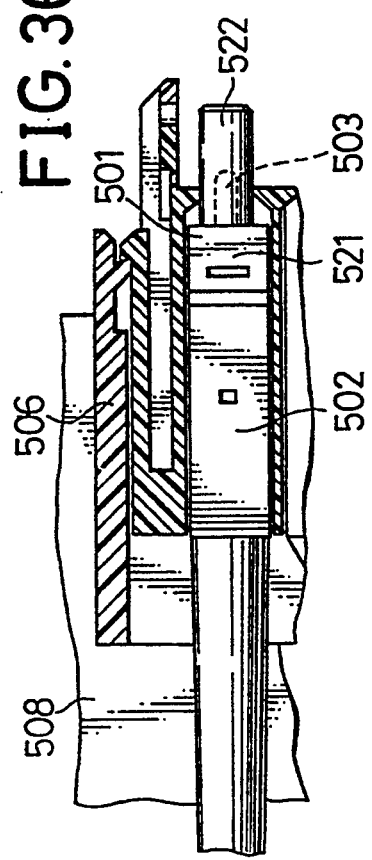
FIG.36(a)
FIG.36(b)

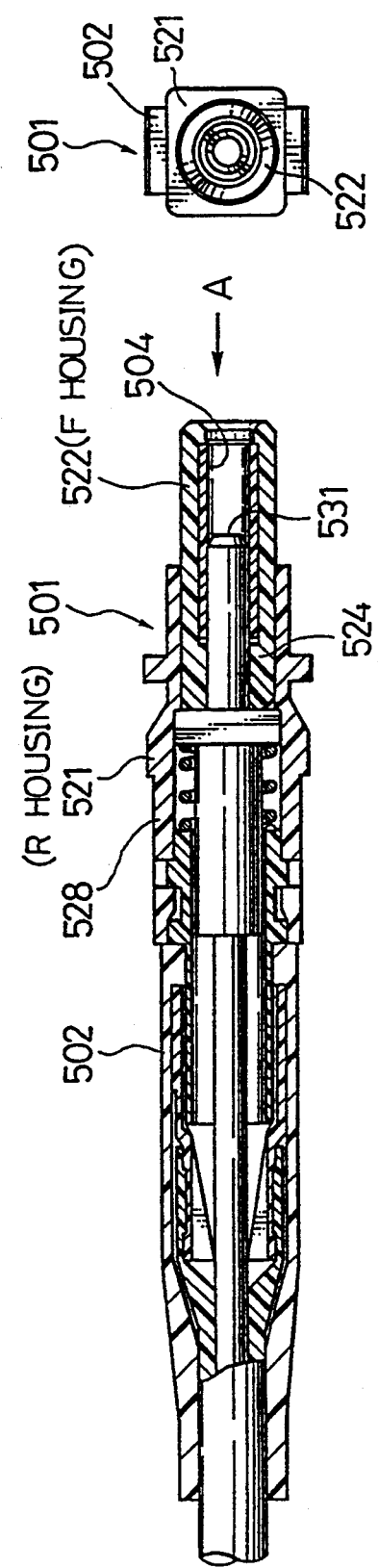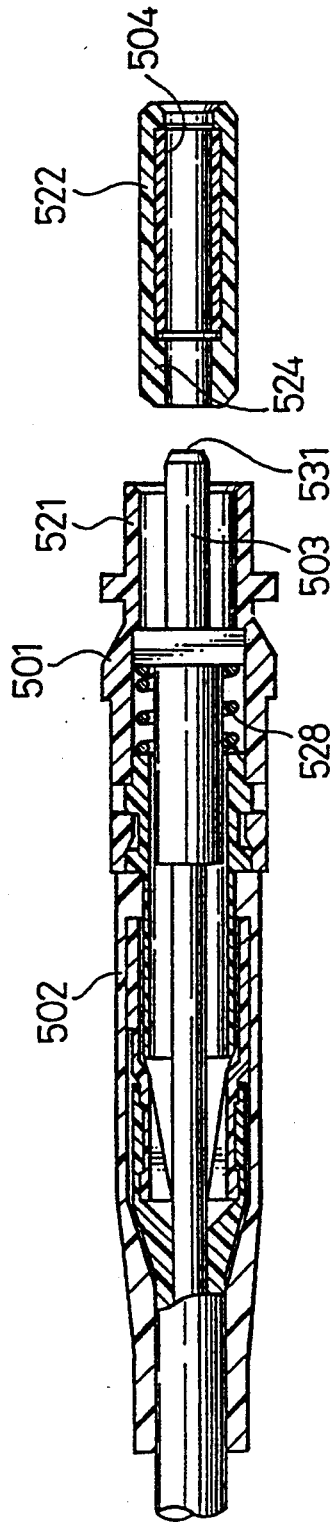

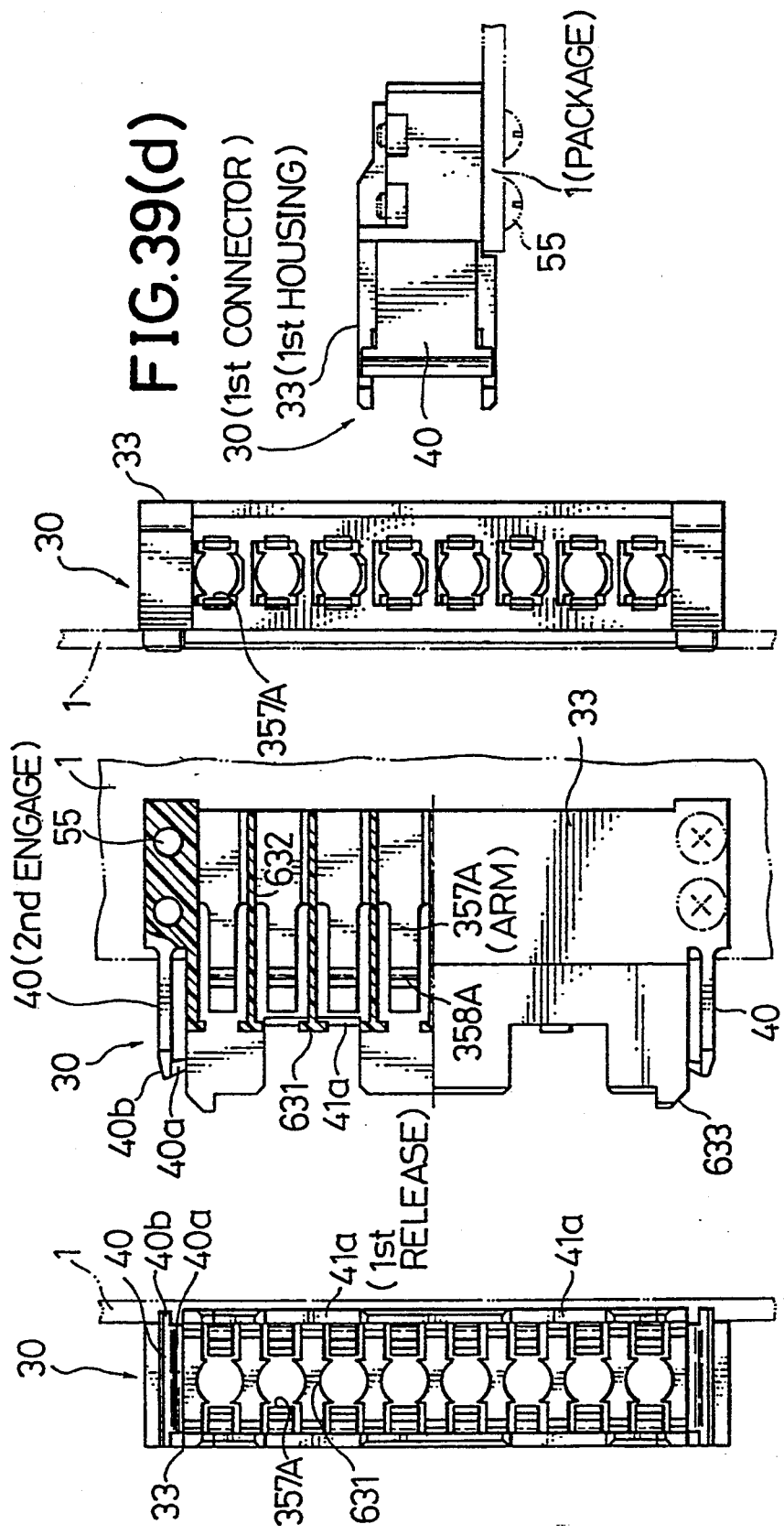

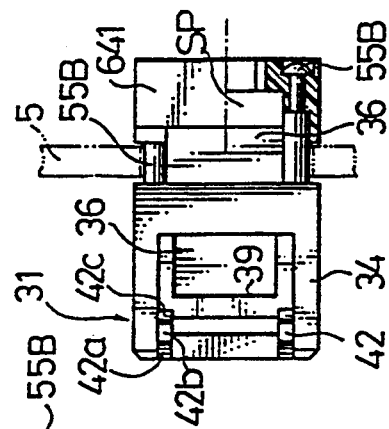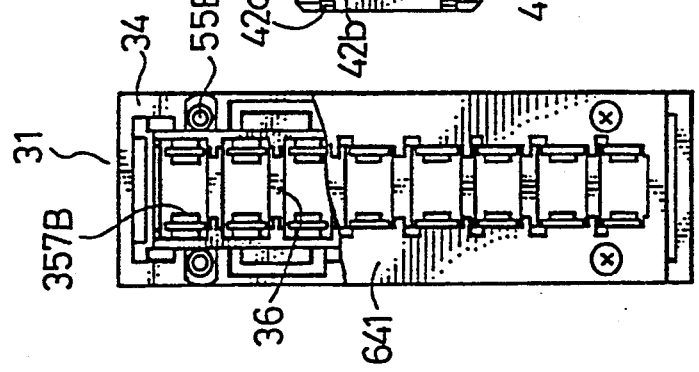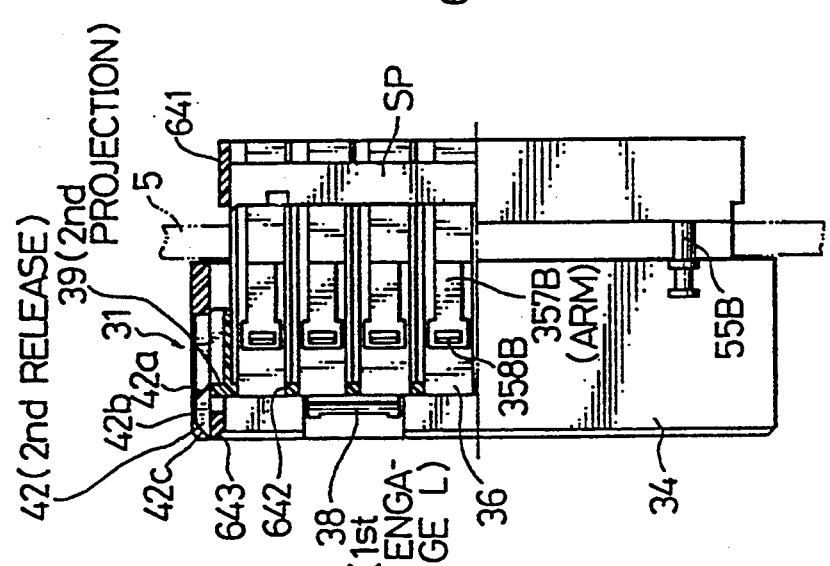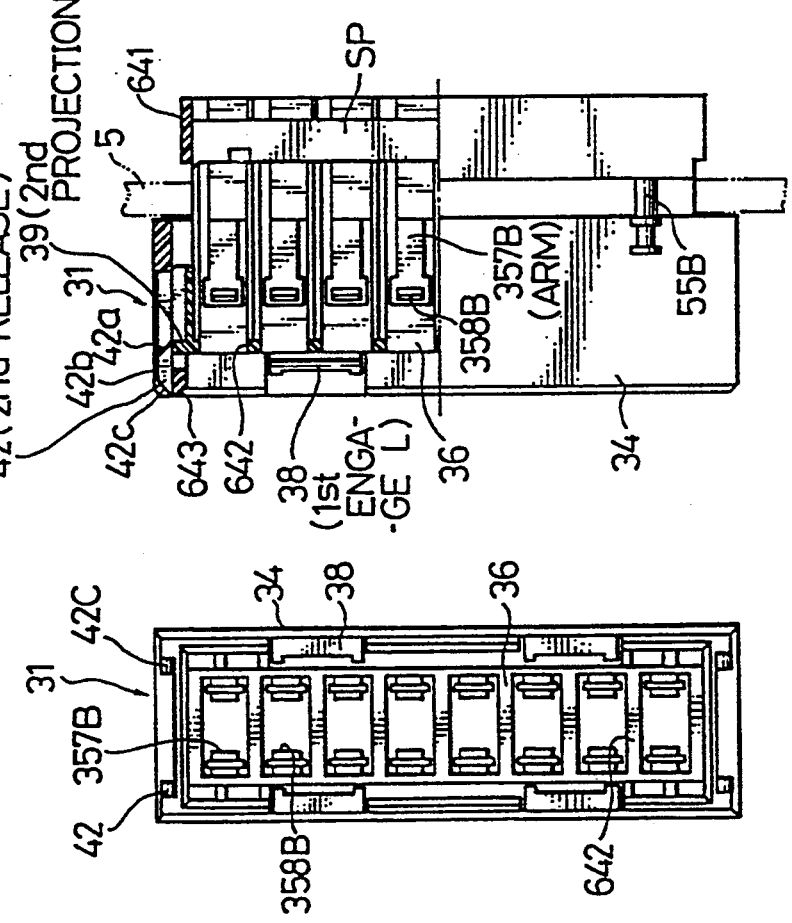

OPTICAL CONNECTOR PLUG

RELATED APPLICATION

This is a continuation of co-pending application Ser. No. 07/773,212, filed on Oct. 9, 1991, and now abandoned.

This application is a divisional application of our prior copending application for U.S. patent entitle "OPTICAL CONNECTOR" which was filed on Nov. 21, 1990 and which bears Ser. No. 07/616,981, and which is also now U.S. Pat. No. 5,121,454 issued on Jun. 9, 1992.

BACKGROUND OF THE INVENTION

1. Field of the Invention

The present invention relates to an optical connector for connecting optical fibers, and more specifically to an optical fiber connector preferably applicable to a plug-in optical connector for removably connecting a number of package boards (on each of which various optical and electrical components or parts are mounted as a completed part subassembly) to a back panel perpendicular to the package board in book-shelf fashion to construct a high-density assembly unit.

2. Description of Prior Art

With the progress of higher optical performance in optical communication systems, a higher density assembly unit composed of so-called plug-in connectors is required more and more.

In the plug-in optical connector, it is required that a number of optical fibers must be simultaneously coupled to or decoupled from each other by a simple insertion and removal coupling operation. Further, since a number of optical fibers are coupled to each other under pressure within the connector housings, a certain connector housing locking mechanism is required to prevent the ferrule coupling pressure from being directly applied to the package board and the back panel via the connector housings.

Further, in an optical assembly unit, since a number of backage boards are connected to a back panel via plug-in connectors in book-shelf arrangement fashion, it is necessary to absorb an assembly error in the direction perpendicular to the axial direction of the optical connector element (plug and jack), without increasing the dimensions or the size of the optical connector.

In addition, since a number of optical connector elements (plug and jack) are simultaneously fitted to the plug-in optical connector, it is also necessary to absorb each dimensional and assembling error in the axial direction of the plug/jack. In absorption of the axial coupling error between the plug/jack and the connector, it is not preferable to increase the axial connector length; that is, it is necessary to stably support the plug/jack within the connector housing without increasing the axial length of the plug/jack.

Further, when an optical plug comprising a ferrule which is connected to an end of an optical fiber is fitted to the optical connector, a optical plug locking mechanism including elastic cantilever arm members with a claw at the free end thereof, are provided between the optical plug and the optical connector housing. However, since the locking mechanism is reduced in size more and more with increasing fiber arrangement density, it is necessary to more firmly lock the connector plug to the connector housing, even when a high tensile strength is applied to the optical fiber, in spite of a simple insertion and removal operation.

Further, when the optical plug is inserted into the optical connector, it is particularly preferable that the optical plug is easily fitted to the connector housing in a predetermined orientation to eliminate an axis alignment error between two mated optical ferrules in order to maintain high optical signal transmission characteristics.

Further, when an optical jack comprising a ferrule which is connected to an end of an optical fiber and an alignment sleeve is fitted to the optical connector, it is preferable that the ferrule end can be easily cleaned and further the ferrule alignment sleeve can be easily replaced with a new one, because the wear chip is produced within the ferrule alignment sleeve whenever the optical jack is coupled to or decoupled from the connector housing.

The structure and arrangement of the prior-art optical connector, plug, jack etc. will be described in more detail hereinafter with reference to the attached drawings under DETAILED DESCRIPTION OF THE PREFERRED EMBODIMENTS.

SUMMARY OF THE INVENTION

With these problems in mind, therefore, it is the first object of the present invention to provide an optical connector which can slidably and stably support the optical connector element (ferrule) within the connector housing without increasing the axial length of the ferrule.

It is the second object of the present invention to provide an optical connector by which an optical plug can be firmly locked to the connector housing even when a high tensile force is applied to the optical fiber.

It is the third object of the present invention to provide an optical connector by which the optical plug can be always fitted to the connector housing in a predetermined orientation to eliminate an axis alignment mismatching between two mated optical ferrules.

It is the fourth object of the present invention to provide an optical connector having an optical jack whose ferrule can be easily cleaned and whose ferrule alignment sleeve can be easily replaced with a new one.

To achieve the above-mentioned first object, the optical connector plug including: (a) a plug housing (202) formed with a shoulder portion (253) between a large hollow portion (254) and a small hollow portion (252) and formed no projection between said two portions; (b) a plug ferrule (201) connected to an optical fiber (204) and formed with a flange portion (201b) slidably fitted into the large hollow portion of said plug housing and an end portion (201a) passed through the small hollow portion of said plug housing; and (c) a spring (203) housed within said plug housing to urge the flange portion of said plug ferrule against the shoulder portion (253) of said plug housing. A mated jack ferrule (201) is fitted to the small hollow portion (252) of said plug housing (202) via a sleeve holder (206) having a floating slit sleeve (205) therewithin so as to absorb an axial dimensional fitting error between the plug ferrule and the jack ferrule by axially urging the flange portion (201b) of said plug ferrule by an inner end of the sleeve holder (206) against said spring (203).

According to the present invention, the ferrule is supported within the plug housing, and urged in the axial direction by the spring. When the sleeve holder is inserted from the ferrule support side into the plug housing, the sleeve holder is brought into contact with the flange portion of the ferrule passing through the shoulder portion against the urging force of the spring, so that the ferrule can be inserted deep further from the initial position to absorb the axial positional error.

To achieve the above-mentioned second object, each of said first and third housing (352) further comprises an elastic lever arm (357) axially extending forward and inwardly and having a claw (358) formed with an insertion inclined surface, an engage surface, and a side projection at a free end thereof, and the optical connector further comprises: (a) a plug housing (359) connected to an end of an optical fiber (361) and coupled to said housing, said plug housing having an outer engage projection (360); and (b) a knob block (362) slidably fitted between said housing and said plug housing, said knob block having an outer release projection (364) formed with an engage inclined surface and a release inclined surface. When said plug housing (359) is coupled to said housing (352), the engage inclined surface of the outer release projection (364) of said knob block (362) is brought into contact with said side projection of said inner elastic lever arm (357) of said first or third housing (352) to outwardly deform said inner lever arm so that said outer engage projection (360) is engaged with the engage surface of said inner elastic arm (357); when said plug housing (359) is decoupled from said first or third housing (352), the release inclined surface of the outer release projection (364) is brought into contact with the side projection of said inner elastic lever arm (357) to outwardly deform said inner lever arm so that said inner elastic arm is disengaged from said engage projection (360).

In the optical connector according to the present invention, when the optical plug is inserted into the connector housing, since the engage projections of the optical plug are brought into contact with the claws of the elastic arms provided for the connector housing to deform the elastic arms, the engage surfaces of the engage projections are engaged with the engage surfaces of the claws.

Under these conditions if the optical cord of the optical plug is pulled, although the force is transmitted to the claws via the engage projections, since the point of force application is offset from the base portion of the elastic arm relative to the connector housing, a moment is generated around the elastic arm in such a direction that the elastic arm end goes toward the optical plug side about the fixed end of the elastic arm. As a result, when a tensile force is applied to the optical cord in the direction that the optical plug is separated from the plug adapter, since the elastic arm end moves toward the optical plug side, the engage surface of the claw is further urged toward the engage surface of the engage projection, thus resulting in secure engagement conditions. On the other hand, when the optical plug is removed from the connector housing: that is when the knob block is gripped and the optical plug is pulled away from the connector housing, since the engage release projections of the blocks push upward the engage release side projections of the elastic arms of the connector housing, the elastic arms are deformed in the direction that the engage projections are removed from the claws. Therefore, when the optical cord is pulled, the optical plug can be removed from the connector housing.

To achieve the above-mentioned third object, said first or third housing (416) formed with at least one housing cutout (425) and at least two opposing housing projections (424), and the optical connector further comprises a square cross-section optical connector plug (411) formed with an axially extending plug projection (419) on one side surface thereof so as to be engaged with the housing cutout (425) and with two axially extending plug grooves (418) on two opposing side surfaces thereof so as to be engaged with the two opposing housing projections (424), an outside contour of said square optical connector plug being symmetrical with respect to a plane including an axial center of said connector plug and a middle portion of the plug projection but asymmetrical with respect to the axial center of said connector plug.

In the optical connector according to the present invention, when optical connector plugs are mounted on the connector housing at the highest possible mounting density, since the two opposing side surfaces are symmetrical with respect to a central plane parallel to the two opposing side surfaces but asymmetrical with respect to a central axis of the two opposing side surfaces, it is possible to prevent the optical connector plug from being inserted into the insertion hole of the connector housing in the erroneous mismatching direction opposite to the predetermined direction, thus securing a correct insertion of the plug into the housing at all times.

To achieve the above-mentioned fourth object, the optical connector further comprises an optical connector jack (501) having: (a) a rear housing (521) fitted to said connector housing; (b) a front housing (522) removably engaged with said rear housing; (c) an alignment sleeve (504) fixedly fitted into said front housing; (d) a ferrule (503) connected to an end of an optical fiber and fitted into said alignment sleeve so that a front end thereof extends frontward from the engagement position between said rear and front housings. The front and rear housings are removably engaged with each other via thread or friction.

In the connector jack according to the present invention, the front and rear housings can be removed easily by loosening the thread or releasing them against frictional force. Since the front housing is removed, the alignment sleeve in the front housing is easily removed from the jack for replacement with a new one. Further, after removal of the front housing, since the ferrule end surface projects from the rear housing, the ferrule end surface can be cleaned easily.

In the optical connector according to the present invention, although various features have been explained of the optical connector composed of two connector housings. Without being limited thereto, however, it is also possible to apply the features of the present invention to the optical adapter for connecting a single optical plug and jack.

BRIEF DESCRIPTION OF THE DRAWINGS

FIGS. 2 to 3 show a first embodiment of the optical connector according to the present invention for assistance in explaining the first feature thereof;

FIG. 2 is a partially broken, perspective view of the optical connector;

FIGS. 3(a) to 3(j) are side cross-sectional views for assistance in explaining the engagement and disengagement steps of the optical connector shown in FIG. 2;

FIG. 4 is a plan, partially broken view thereof;

FIG. 5 is a side, partially broken view thereof;

FIGS. 8 to 11 show an embodiment of the floating structure of the plug-in connector according to the present invention for assistance in explaining the second feature thereof;

FIGS. 9(a) and 9(b) are enlarged cross-sectional views taken along the lines II—II and III—III in FIG. 8(a), respectively;

FIG. 10(a) is an enlarged plan view showing a slot member fixed to a package board;

FIG. 10(b) is an enlarged view showing the axle member fitted to the slot member;

FIG. 11 is an exploded view showing the essential portions of the floating structure for assistance in explaining the method for assembly;

FIGS. 15 to 17 are views for assistance in explaining the third features of the present invention;

FIG. 19 is a partially broken, cross-sectional view showing an embodiment in which the optical connector according to the present invention is applied to a push-pull optical connector using an adapter;

FIG. 20 is a front view showing the optical plug thereof;

FIG. 21 is a plan view of the same;

FIG. 22 is a left side views of the optical plug shown in FIG. 20;

FIG. 23 is a pricipal illustration showing the engagement relationship of the optical connector;

FIG. 24 is a partially broken, cross-sectional view showing another embodiment in which the optical connector according to the present invention is applied to a plug-in optical connector fixed to a back panel;

FIGS. 27 to 31 are views for assistance in explaining the fifth feature of the present invention;

FIG. 27 is a perspective view showing an embodiment of the optical connector according to the present invention;

FIG. 28(a) is a front view showing the same;

FIG. 28(b) is a top view showing the same; FIG. 28(c) is a side, partially cross-sectional view showing the same;

FIG. 28(d) is a bottom view showing the same; plug of the present invention;

FIG. 29 is a side cross-sectional view showing the state where the optical connector plug is inserted;

FIG. 30 is a plan view showing the connector housing of the present invention;

FIGS. 33 to 38 are views for assistance in explaining the sixth feature of the present invention;

FIG. 35 is a cross-sectional view showing a modification of the front housing;

FIG. 36(a) is a partially broken cross-sectional view showing the entire construction of a third embodiment of the optical connector jack according to the present invention; FIG. 36(b) is a cross-sectional view showing a pair of optical connector jack and the optical connector;

FIG. 37(a) is a cross-sectional view showing an optical connector jack;

FIG. 37(b) is a side view showing the same optical connector jack shown in FIG. 37(a);

FIG. 38 is a similar cross-sectional view showing the optical connector jack shown in FIG. 37(a) from which the front housing is removed away;

FIGS. 39 to 41 are views for assistance in explaining the first to fifth features of the optical connector according to the present invention;

FIG. 39(a) is a left side view showing one embodiment of the first optical connector applied to a plug-in optical connector;

FIG. 39(b) is a front view showing the same; FIG. 39(c) is a right side view showing the same; FIG. 39(d) is a top view showing the same; FIG. 41(a) is a left side view showing one embodiment of the second optical connector applied to a plug-in optical connector;

FIG. 41(b) is a front view showing the same;

FIG. 41(c) is a right side view showing the same;

FIG. 41(d) is a top view showing the same;

Figure 1A:
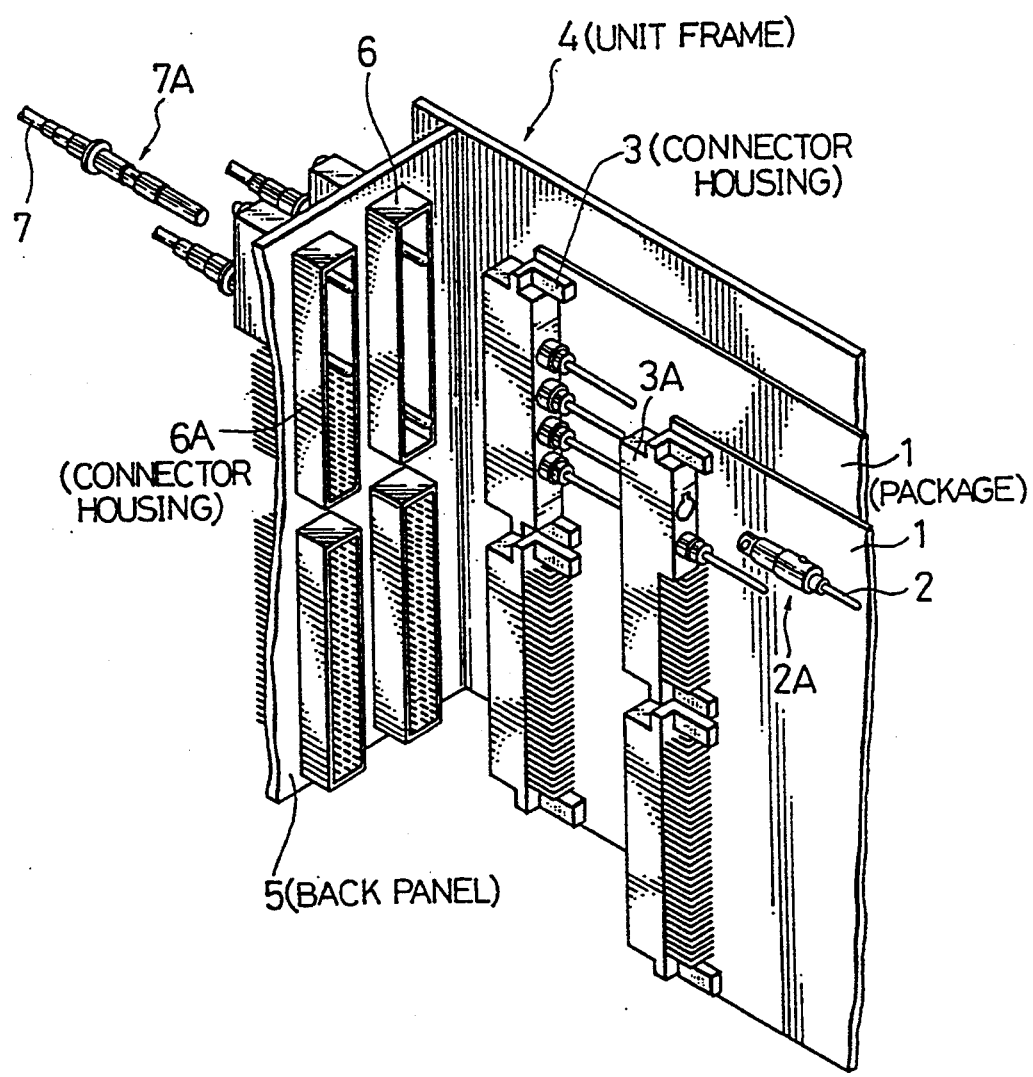
FIG. 1(a) is a perspective view showing prior-art plug-in optical connectors arranged in book-self arrangement fashion into an assembly unit for assistance in explaining the function thereof.
Figure 1B:
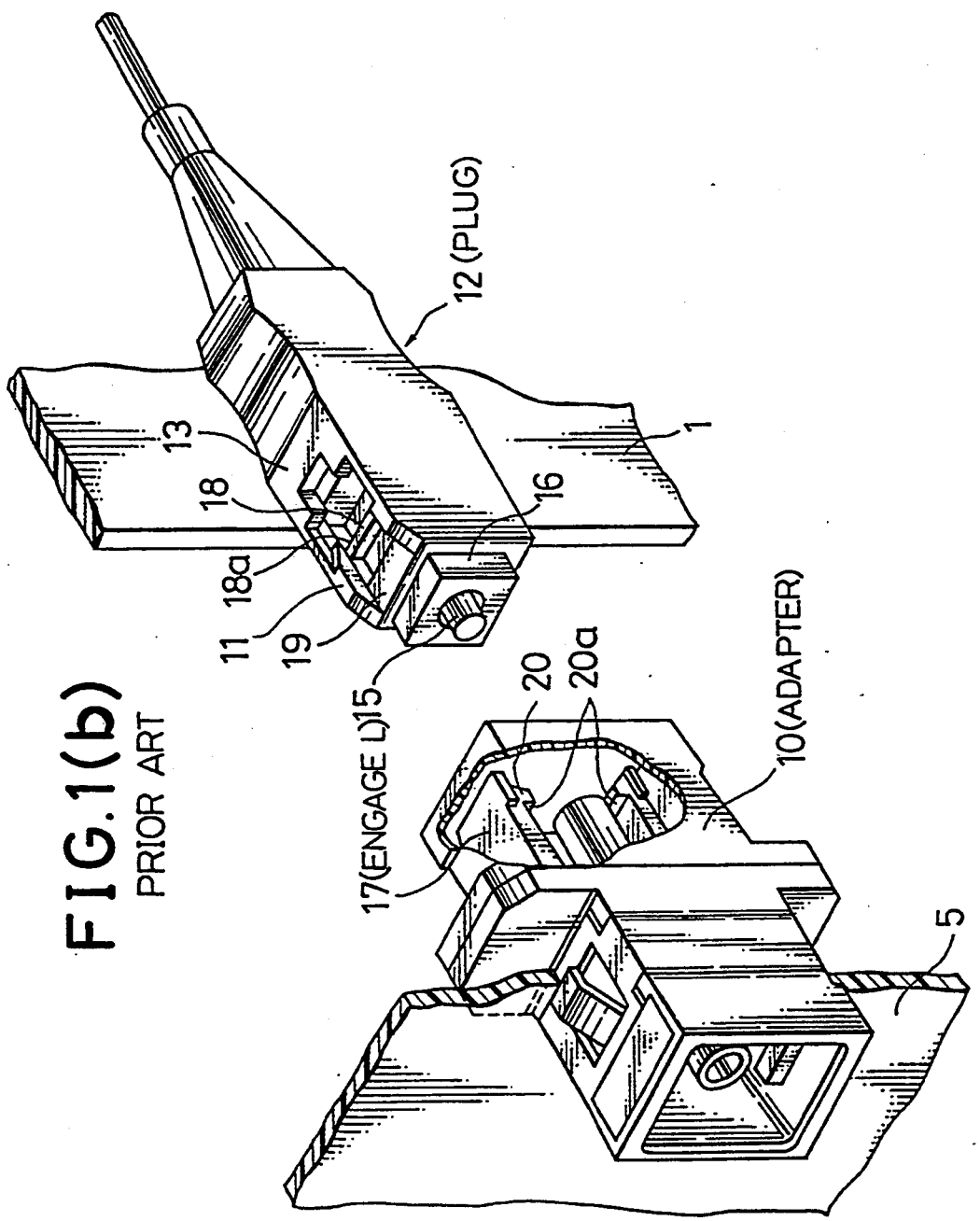
FIG. 1(b) is a perspective, partially broken view showing a prior-art push-pull optical connector using an adapter.
Figure 2:
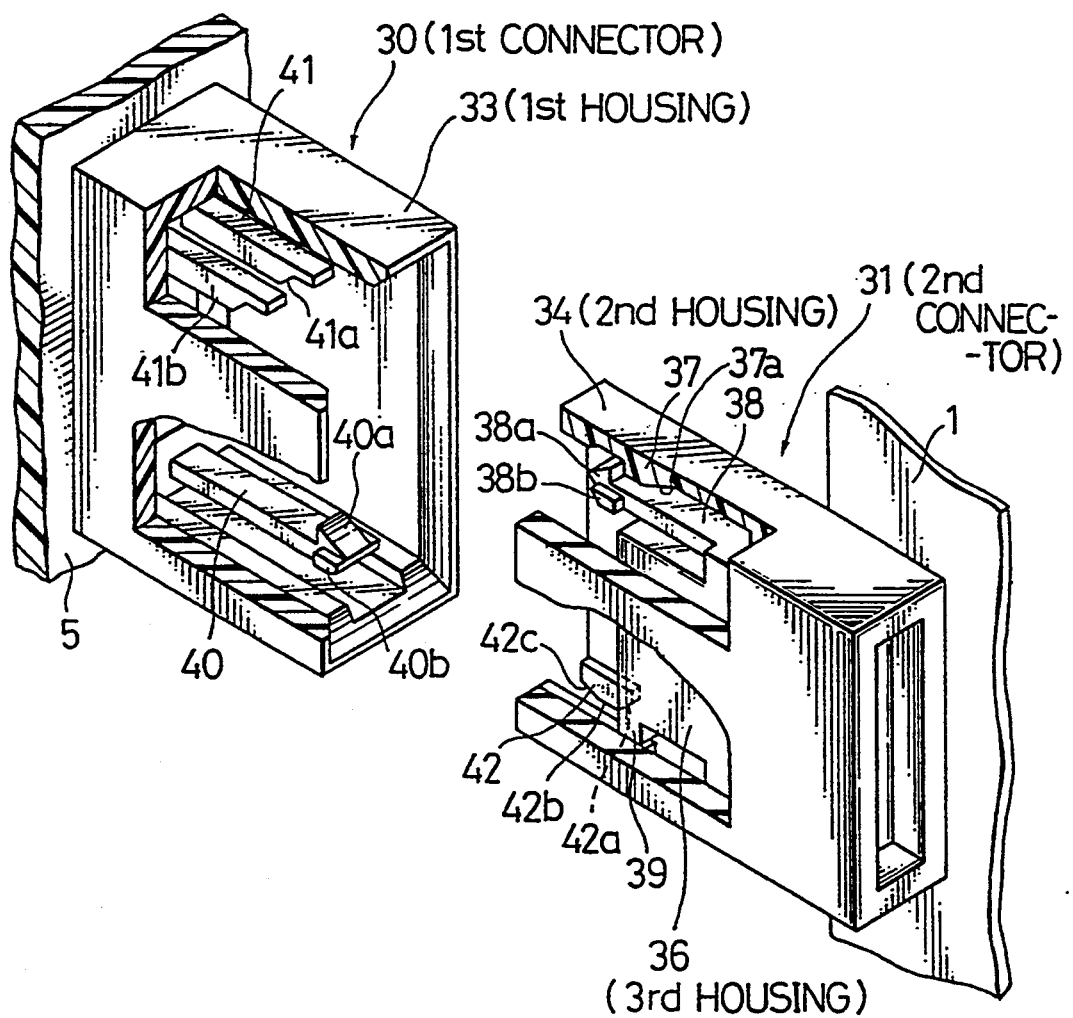
Figure 3C:
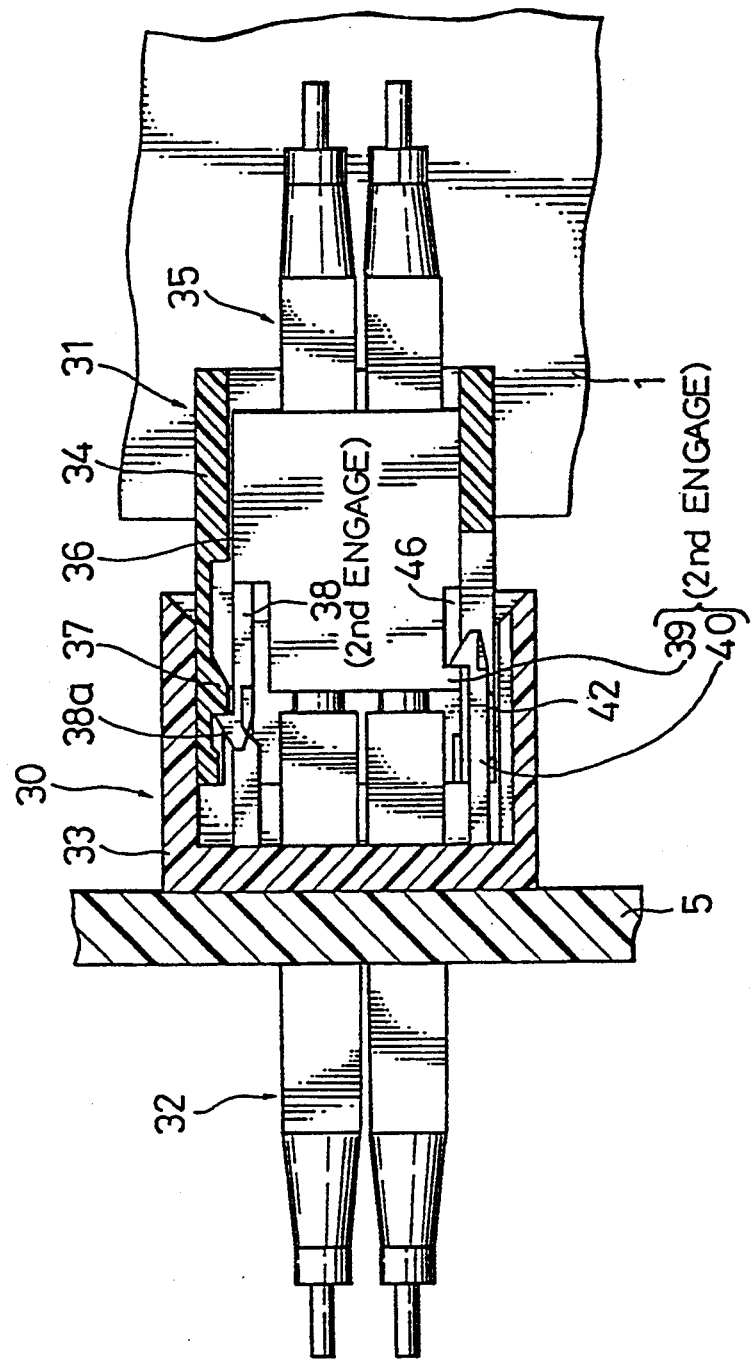
Figure 3D:
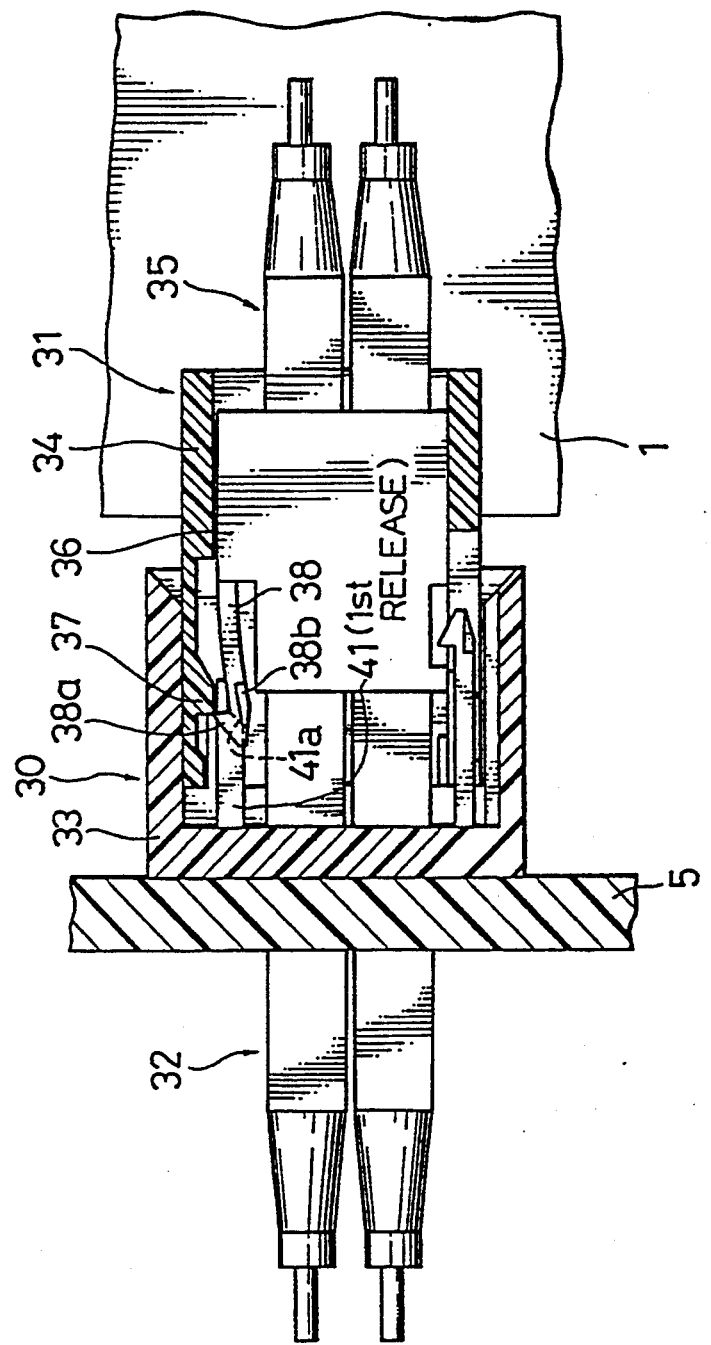
Figure 3E:
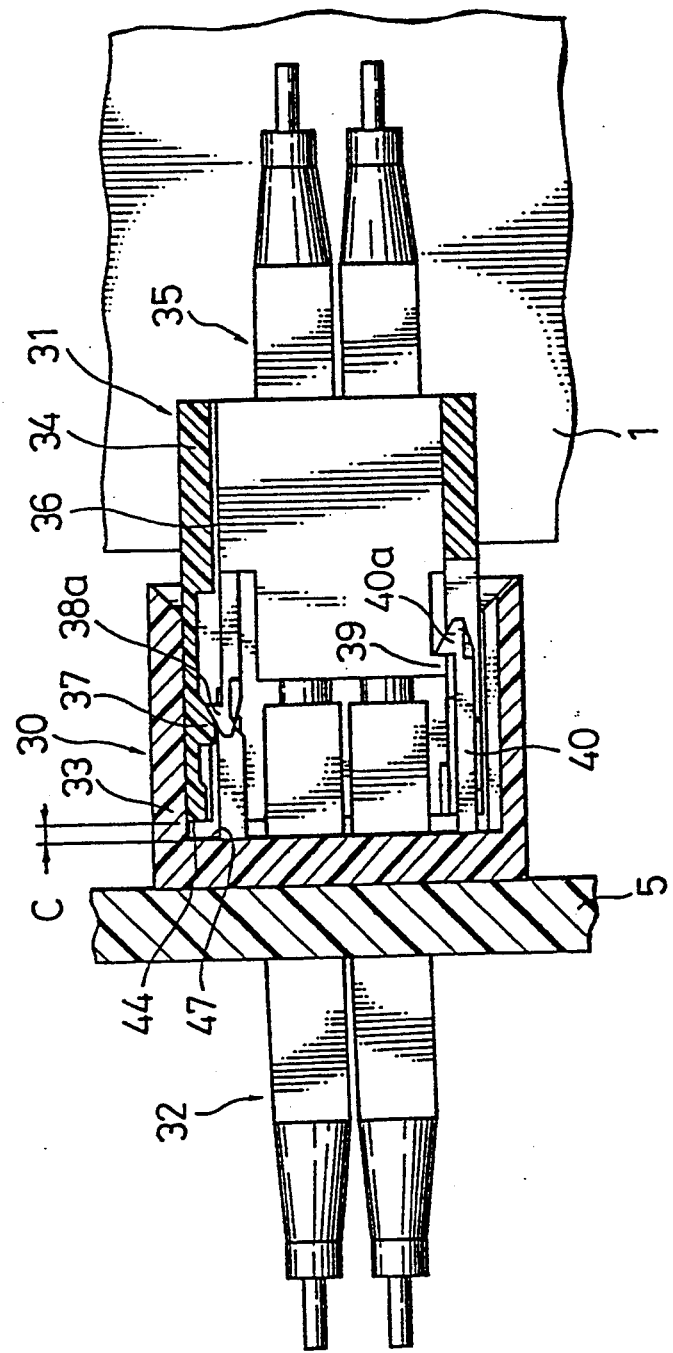
Figure 3F:
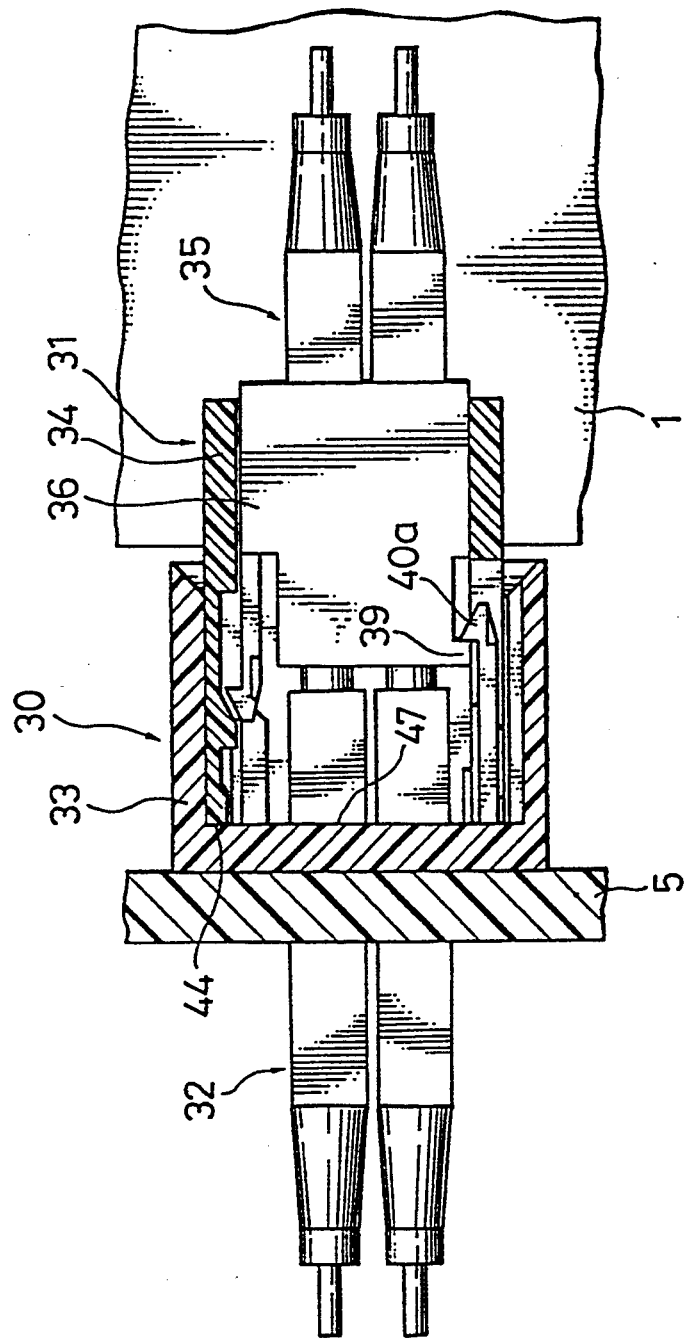
Figure 3H:
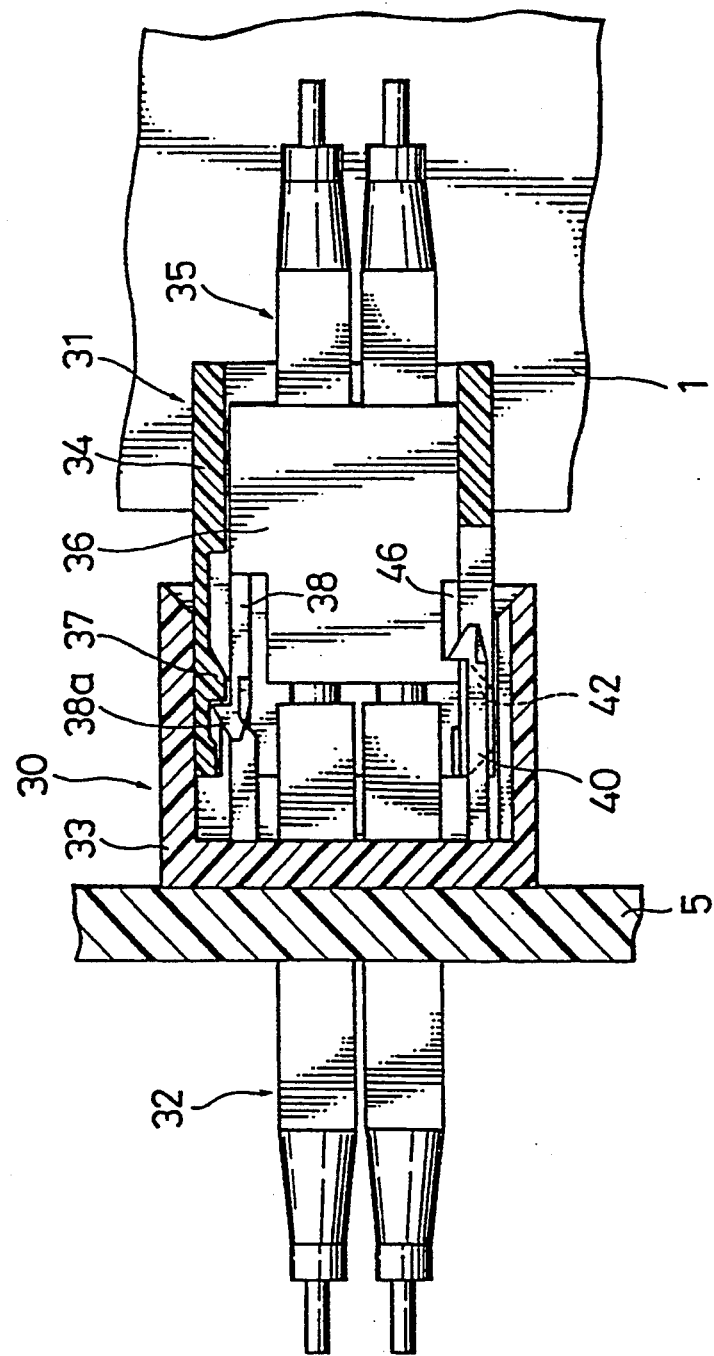
Figure 3J:
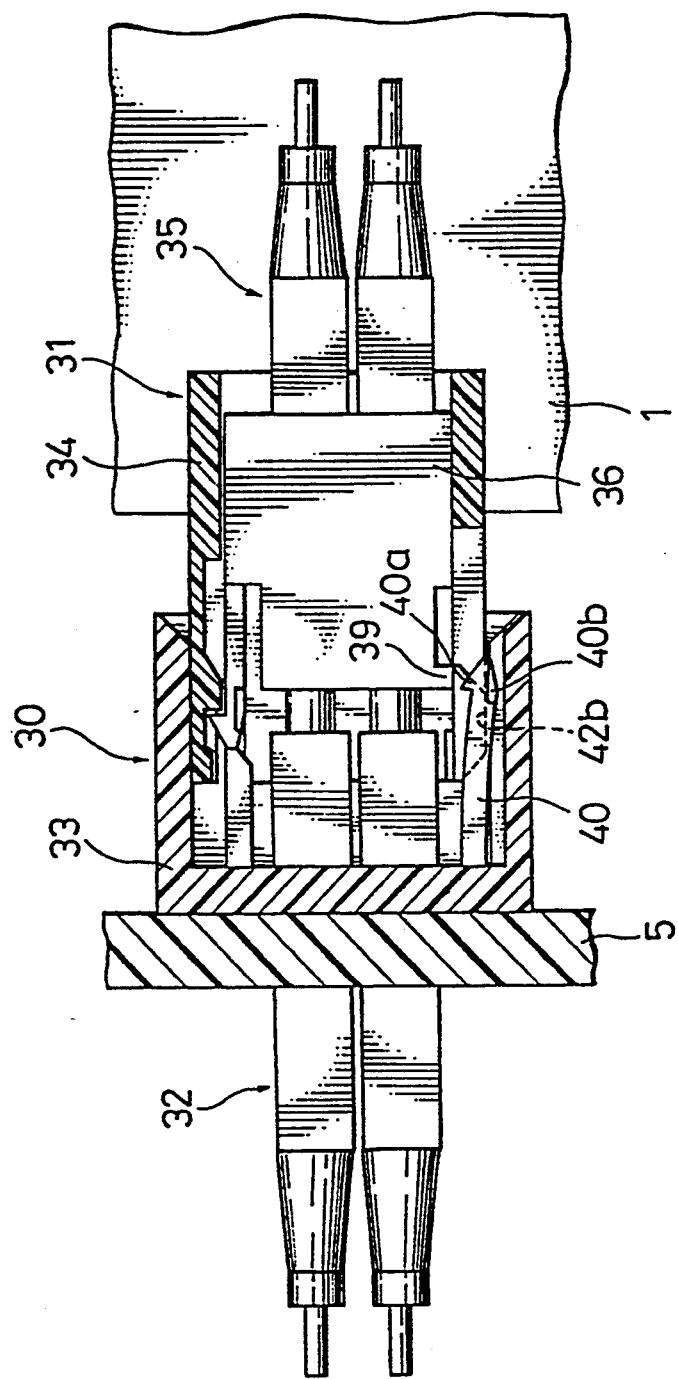
Figure 4:
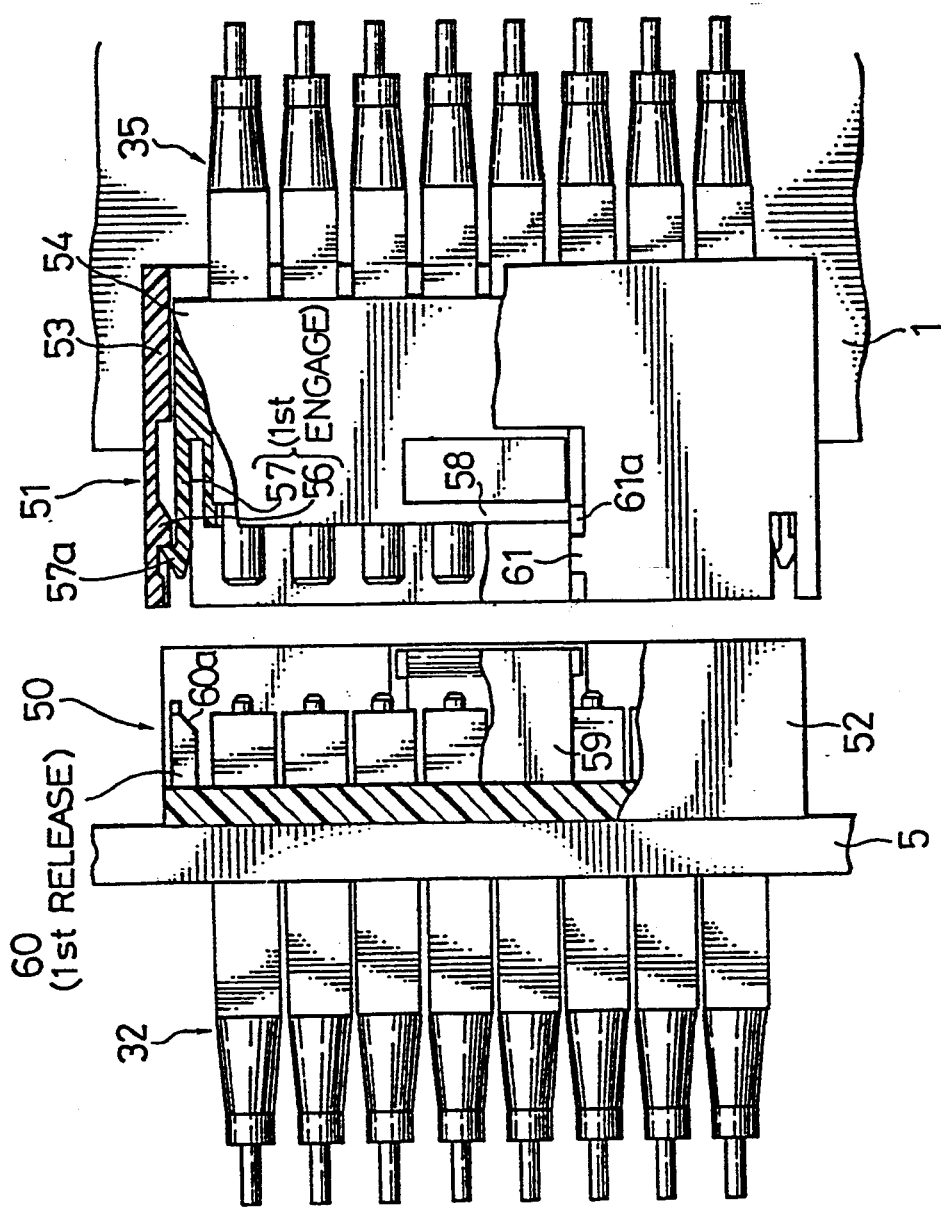
FIGS. 4 and 5 show a second embodiment of the optical connector according to the second embodiment, in which the number and the location of the engage means and the release means are modified so as to be applicable to a plug-in connector.
Figure 5:
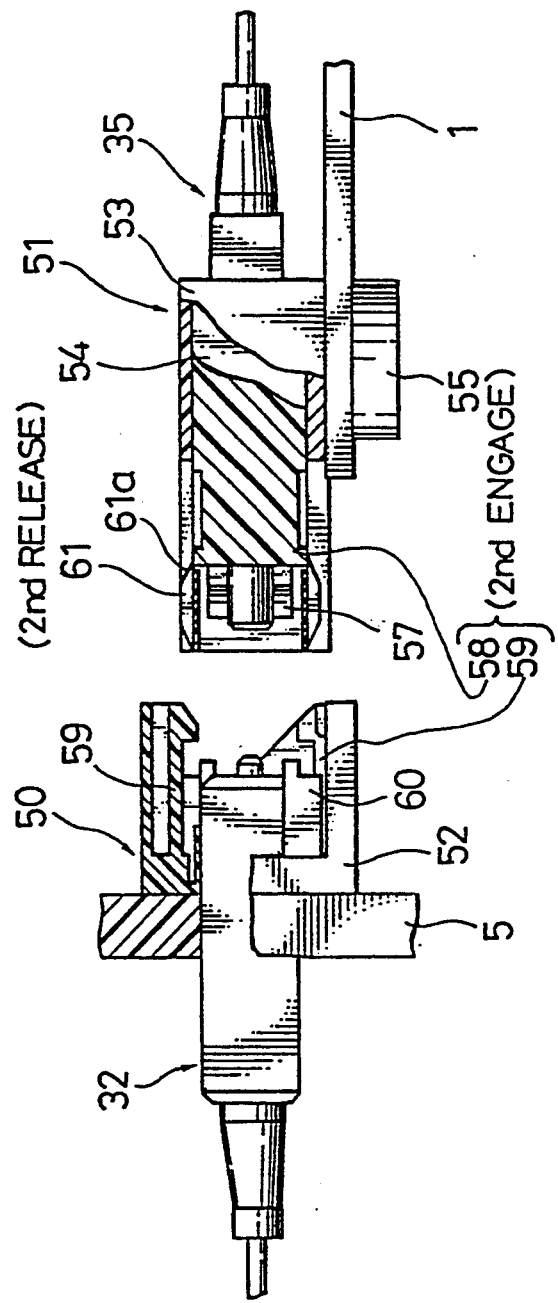
Figure 6:
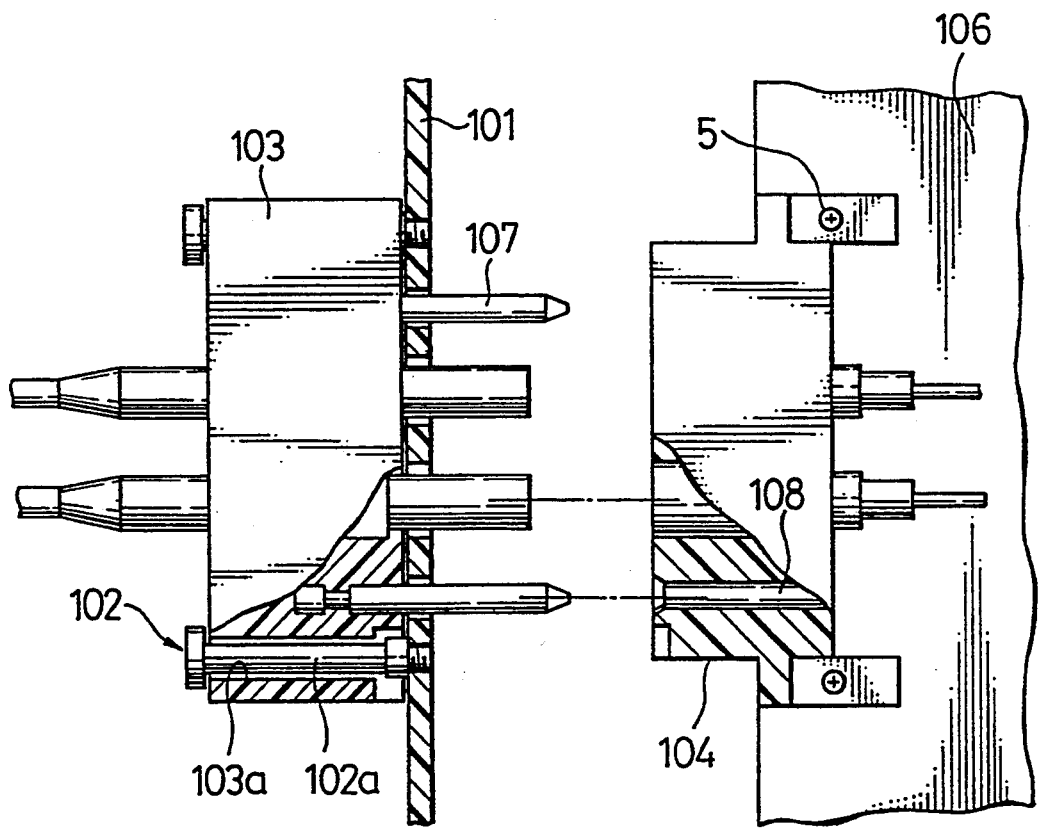
FIGS. 6 and 7 are plan views showing prior-art floating structure of the plug-in connector.
Figure 7:
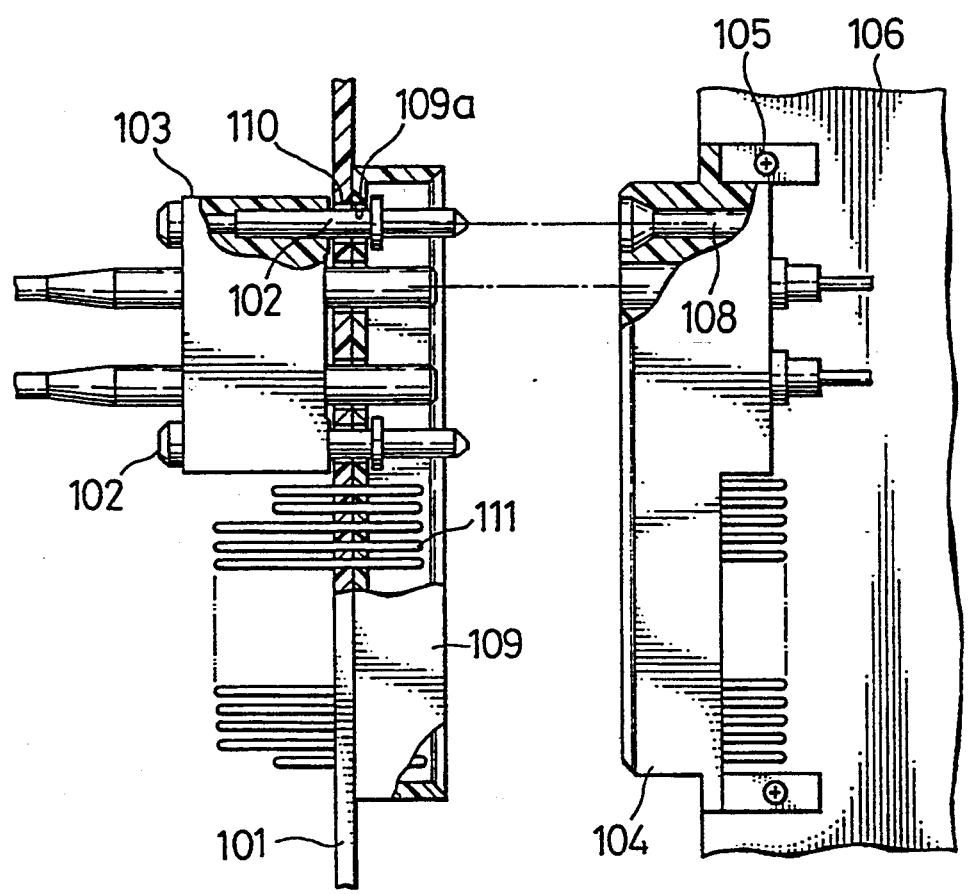
Figure 8A:
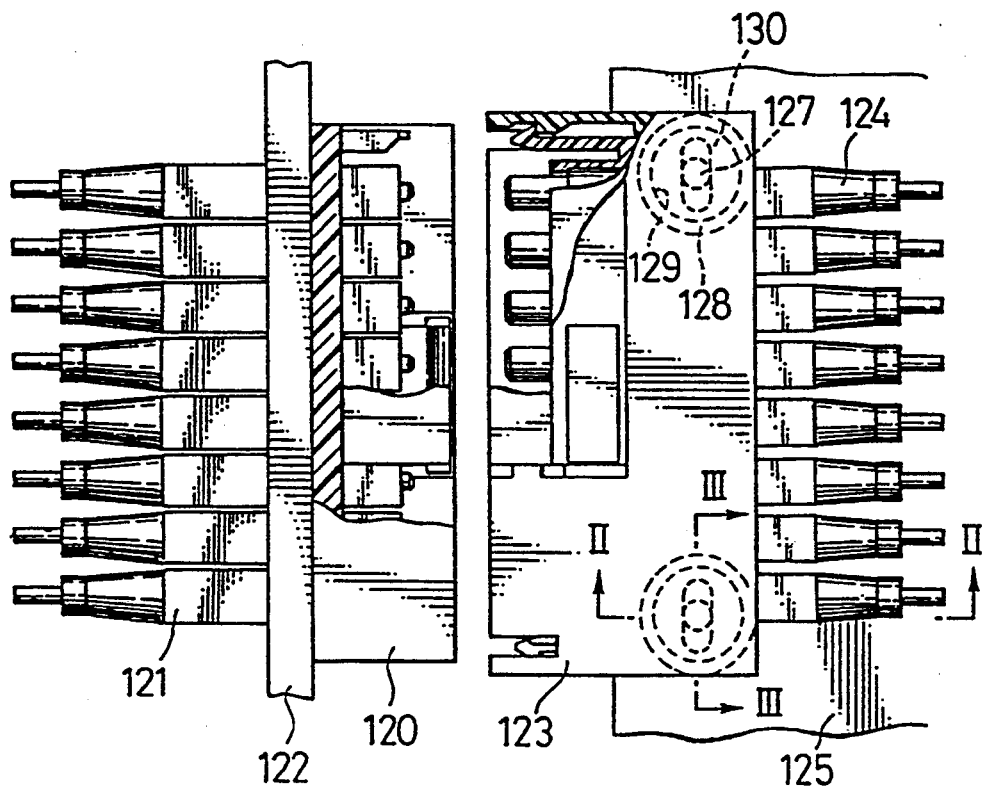
FIGS. 8(a) and 8(b) are partially cross-sectional, plan and side view thereof.
Figure 8B:
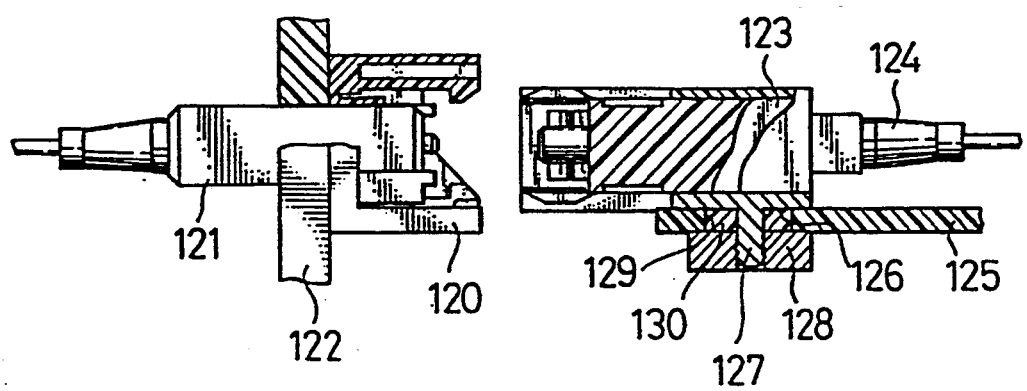
Figure 11:
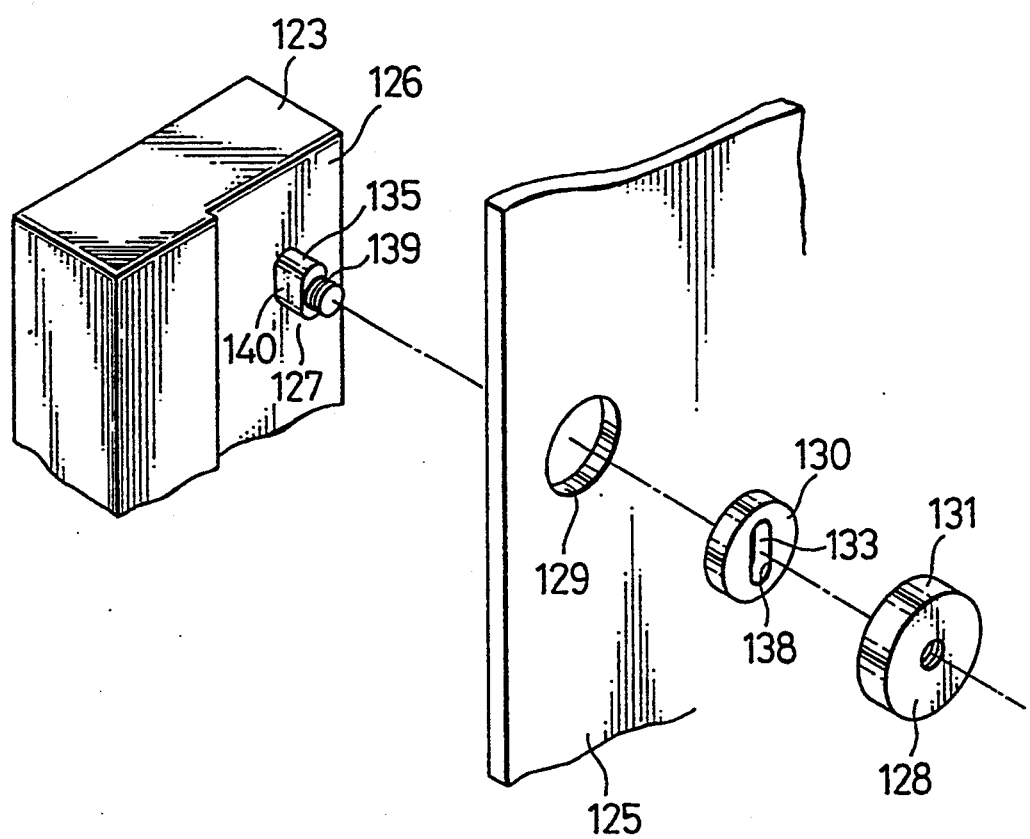
Figure 12:
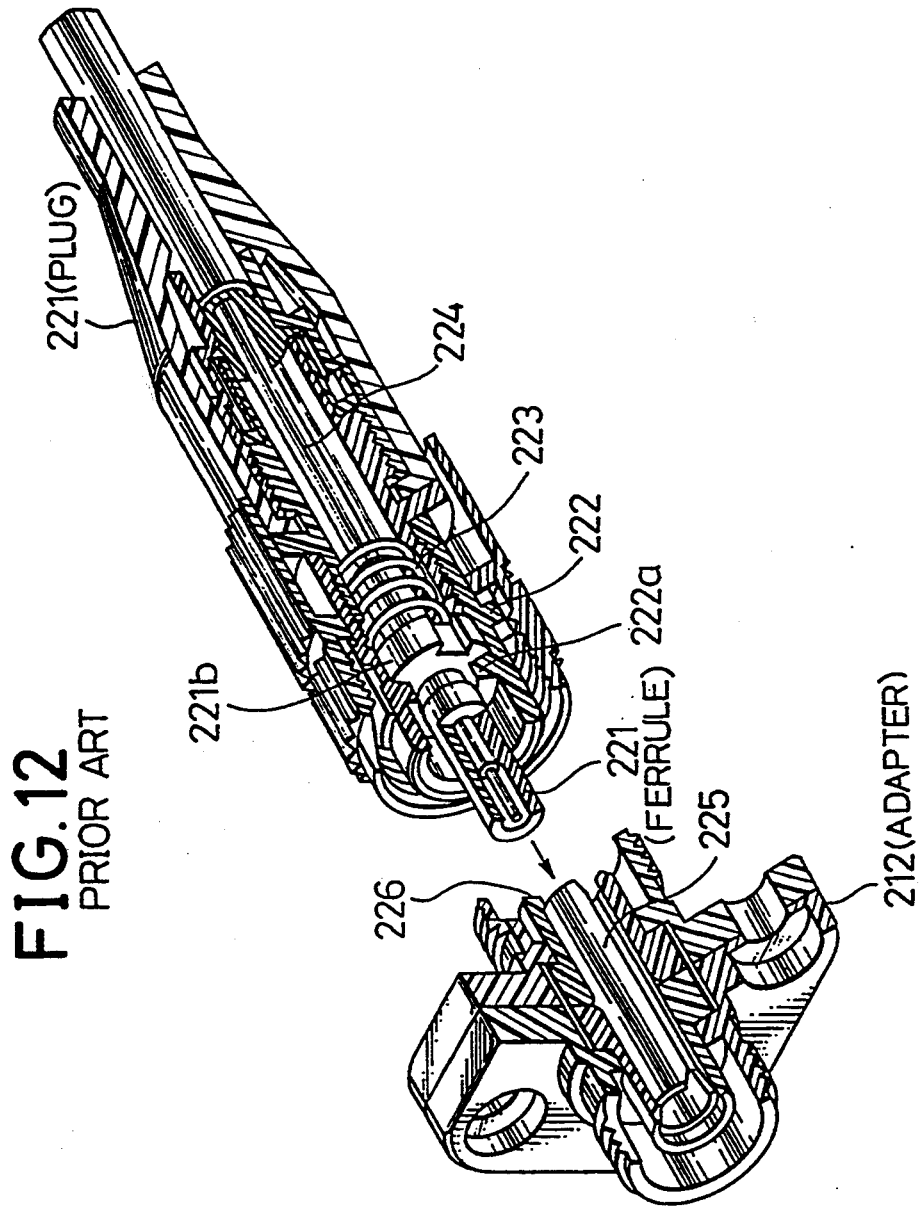
FIG. 12 is a perspective, partially broken view showing a prior-art optical connector connected via an adapter.
Figure 13A:
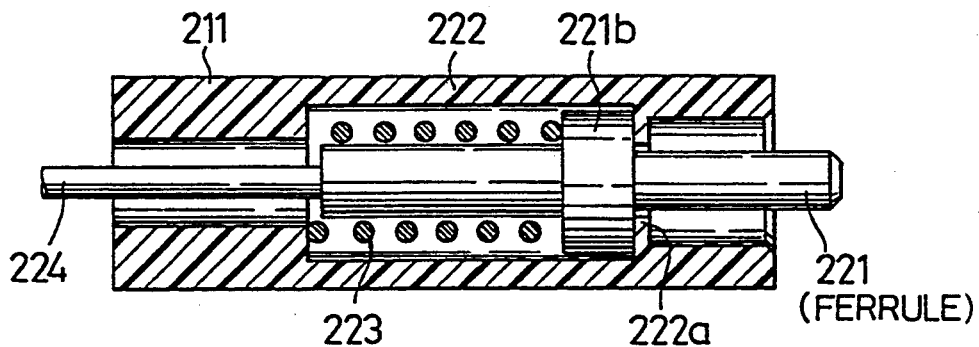
FIGS. 13(a) to 13(c) are side cross-sectional views for assistance in explaining the engagement positional relationship between the plug and the sleeve holder when a prior-art optical connector is applied to the plug-in optical connector.
Figure 13B:
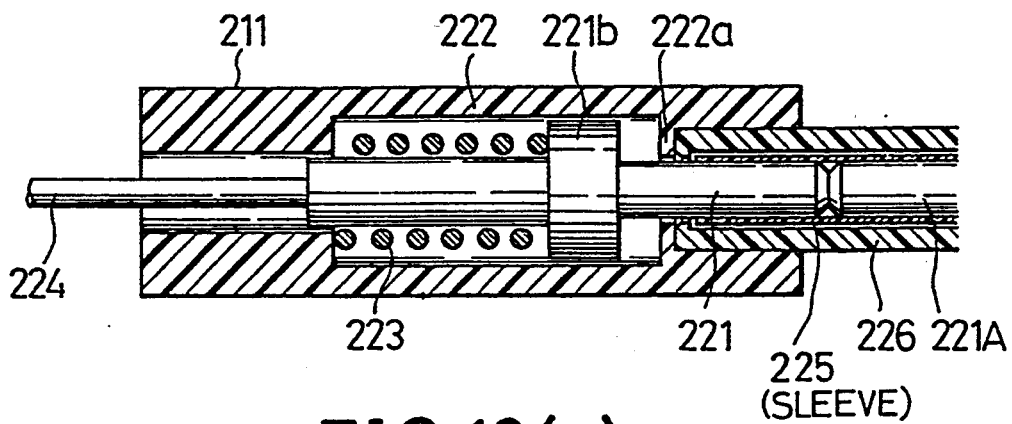
Figure 13C:
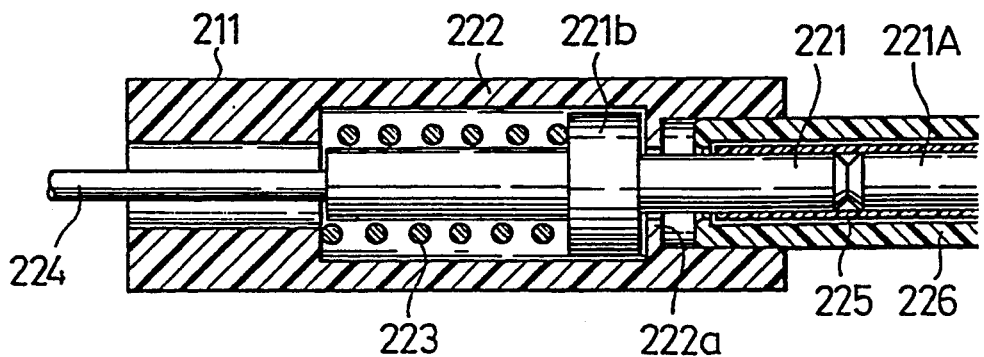
Figure 14A:
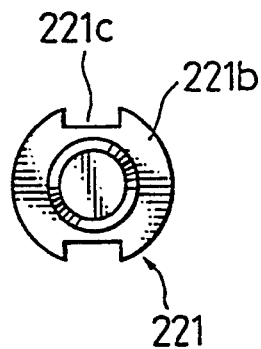
FIG. 14(a) is a front view showing a prior-art ferrule.
Figure 14B:
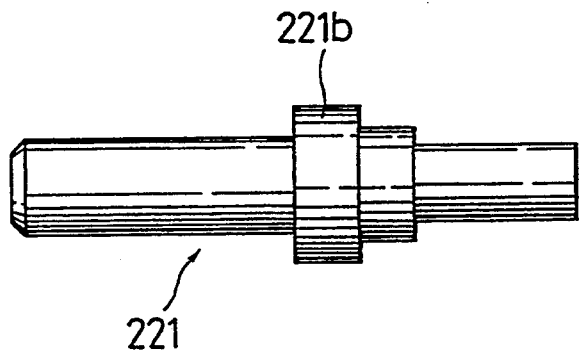
FIG. 14(b) is a side view showing the same prior-art ferrule.
Figure 15A:
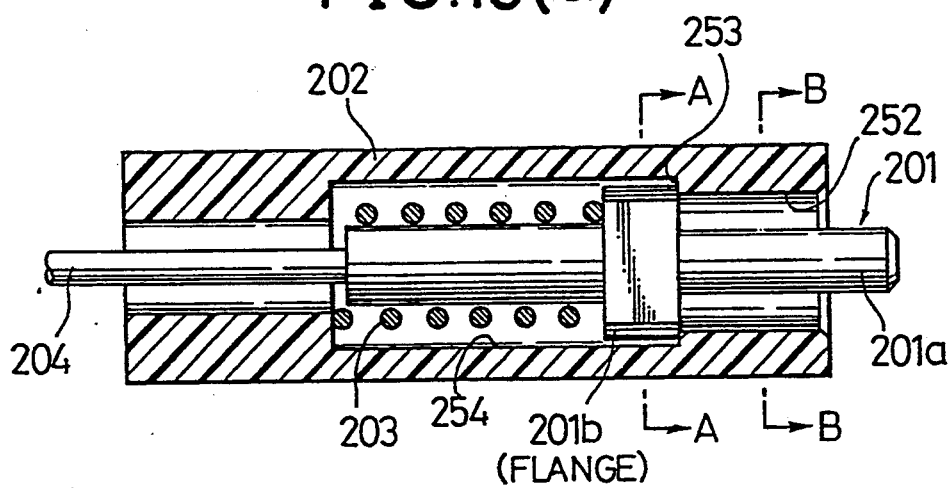
FIG. 15(a) is a cross-sectional view showing an embodiment of the optical connector plug according to the present invention.
Figure 15B:
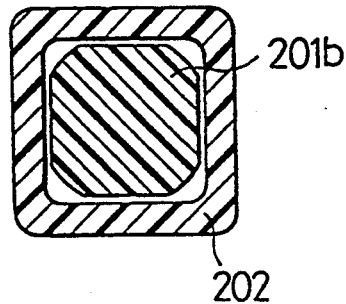
FIG. 15(b) is a cross-sectional view taken along the line A—A in FIG. 1(a)
Figure 15C:
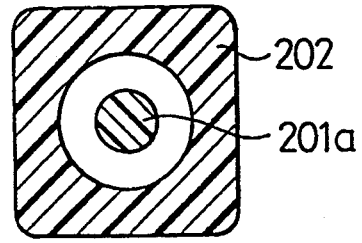
FIG. 15(c) is a cross-sectional view taken along the line B—B.
Figure 16A:
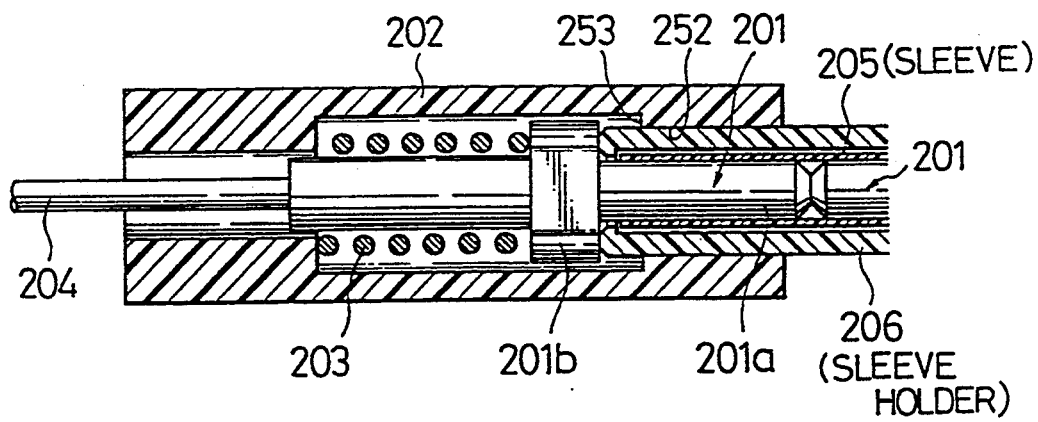
FIGS. 16(a) and 16(b) are cross-sectional views for assistance in explaining the engagement relationship between the optical connector plug and the sleeve holder.
Figure 16B:
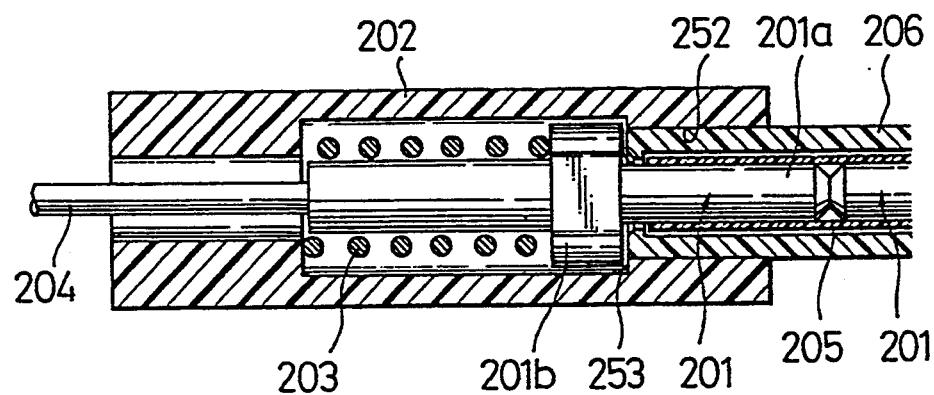
Figure 17A:
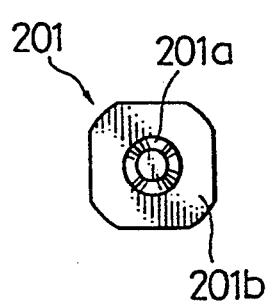
FIG. 17(a) is a front view showing the ferrule.
Figure 17B:
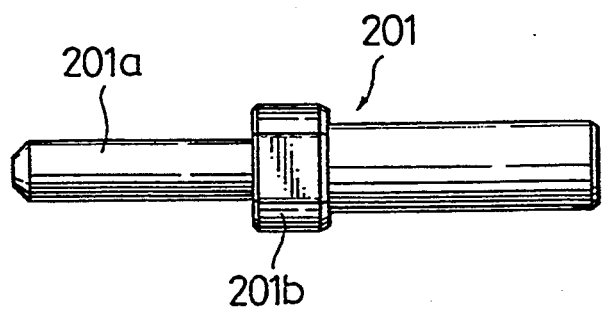
FIG. 17(b) is a side view showing the ferrule.
Figure 18:
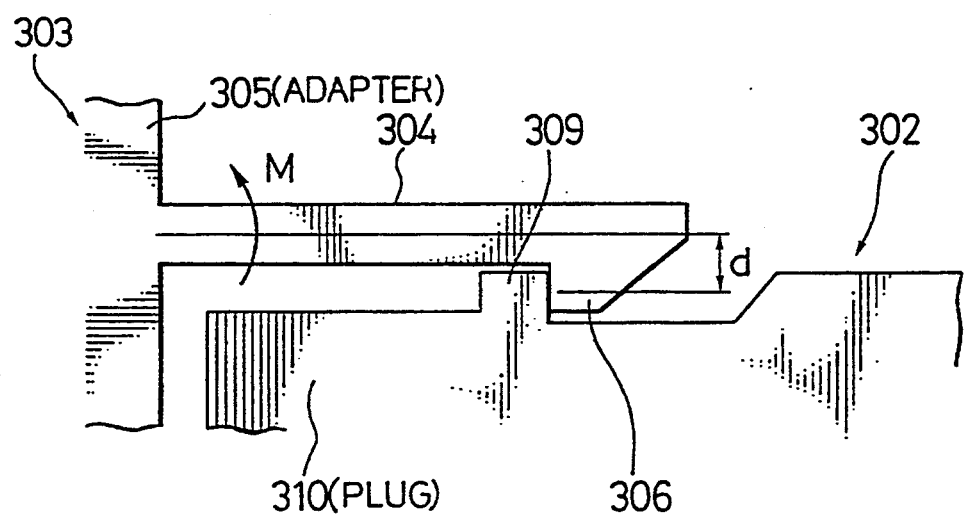
FIG. 18 is a pricipal illustration showing the engagement relationship of the prior-art optical connector.
Figure 19:
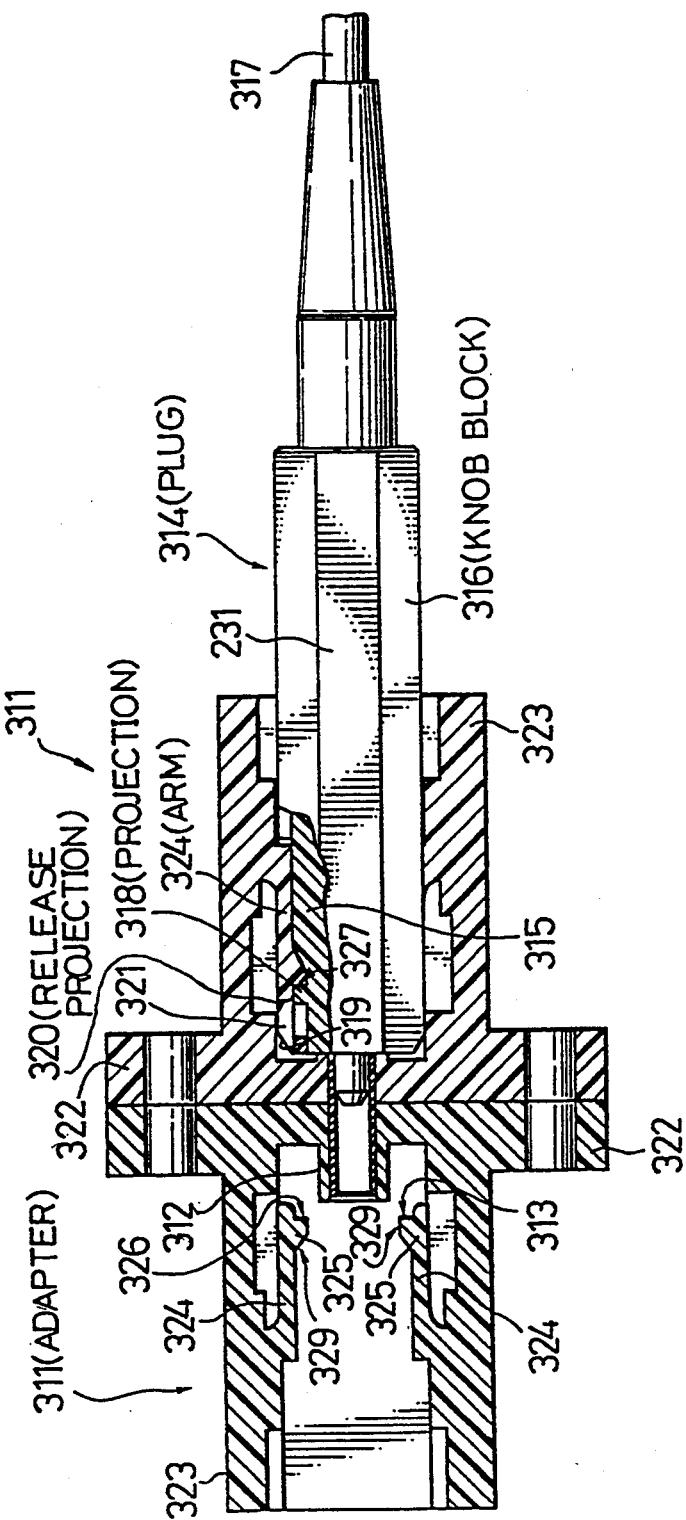
FIGS. 19 to 24 are views for assistance in explaining the fourth feature of the present invention.
Figure 20:
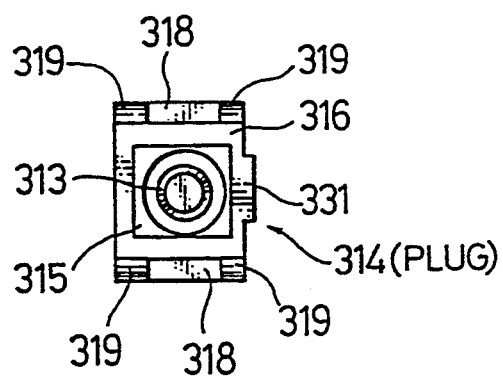
Figure 21:
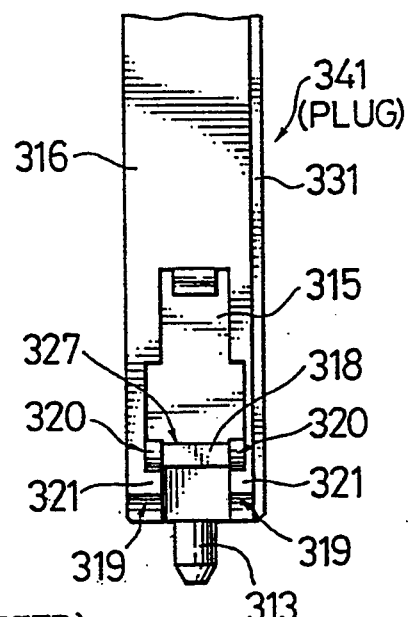
Figure 22:
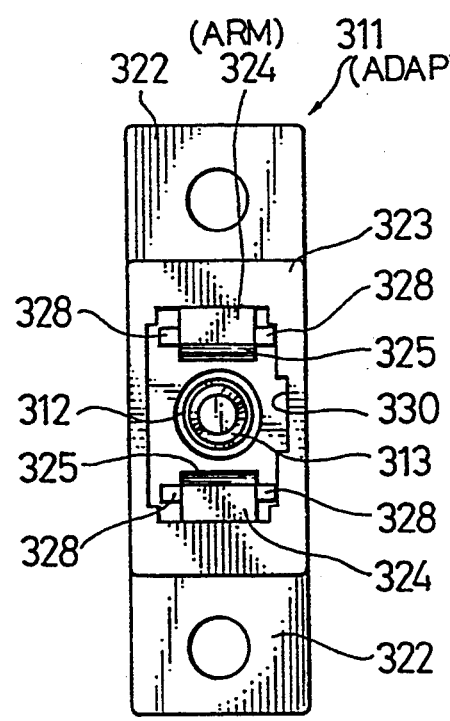
Figure 23:
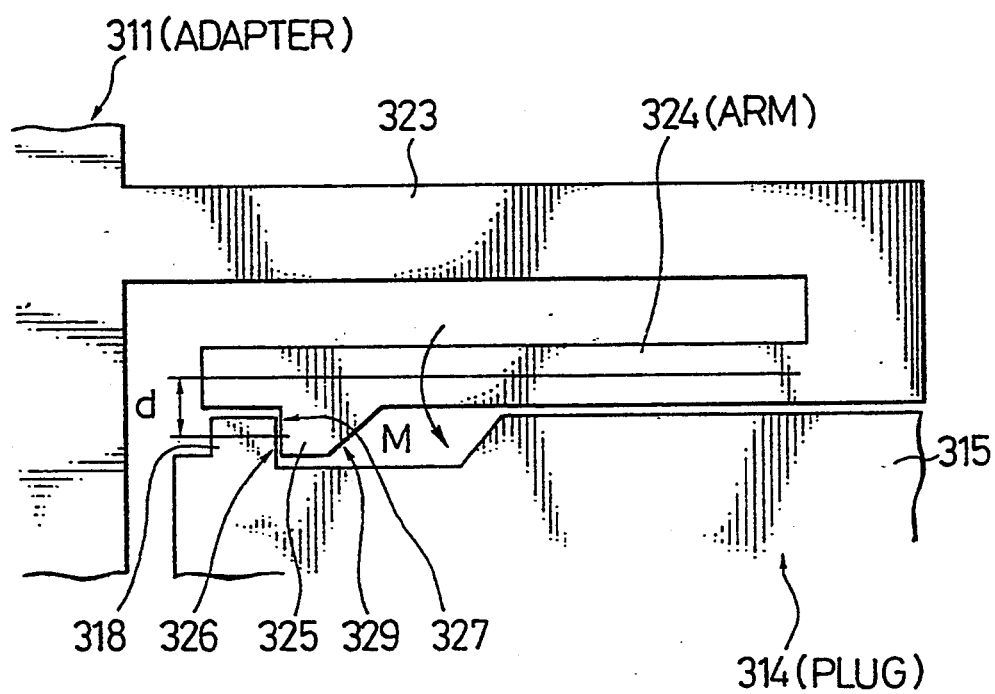
Figure 24:
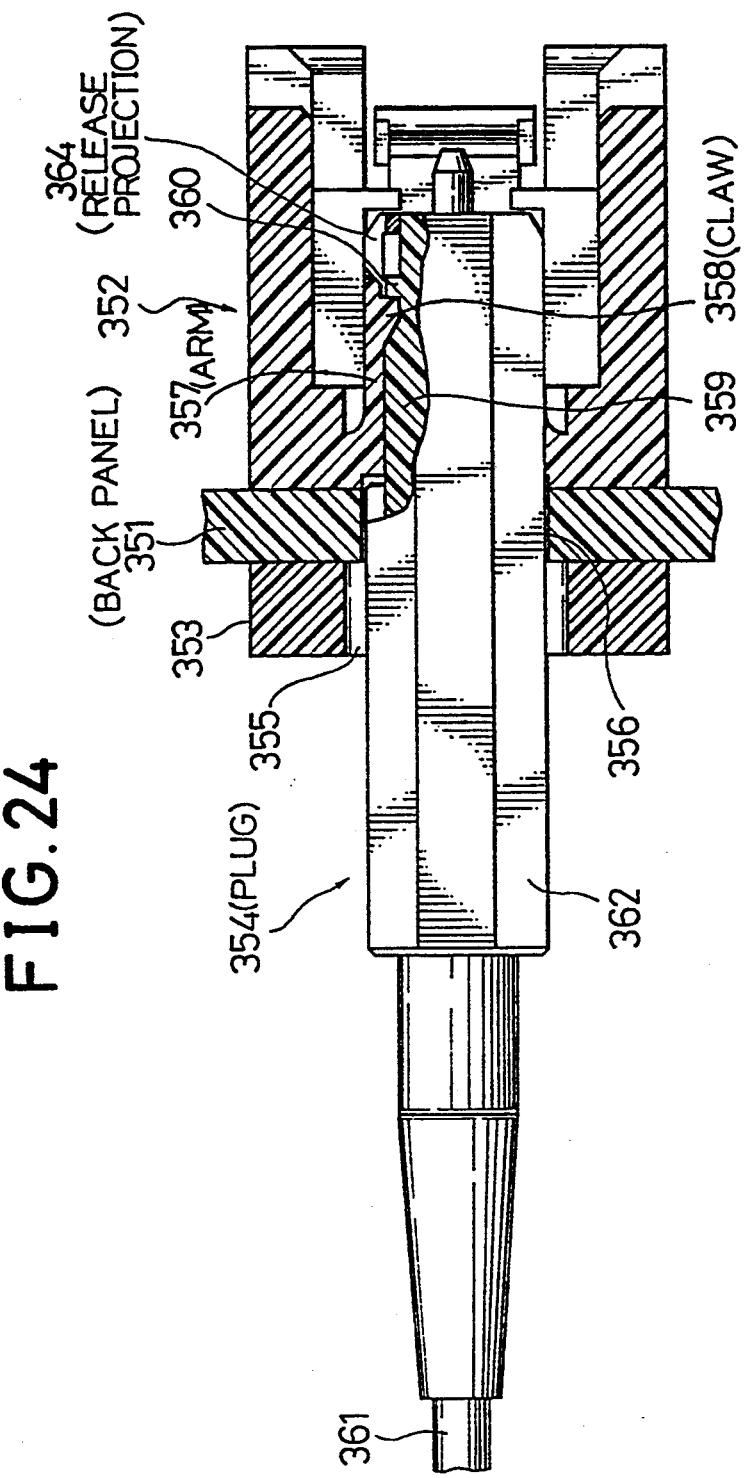
Figure 25:
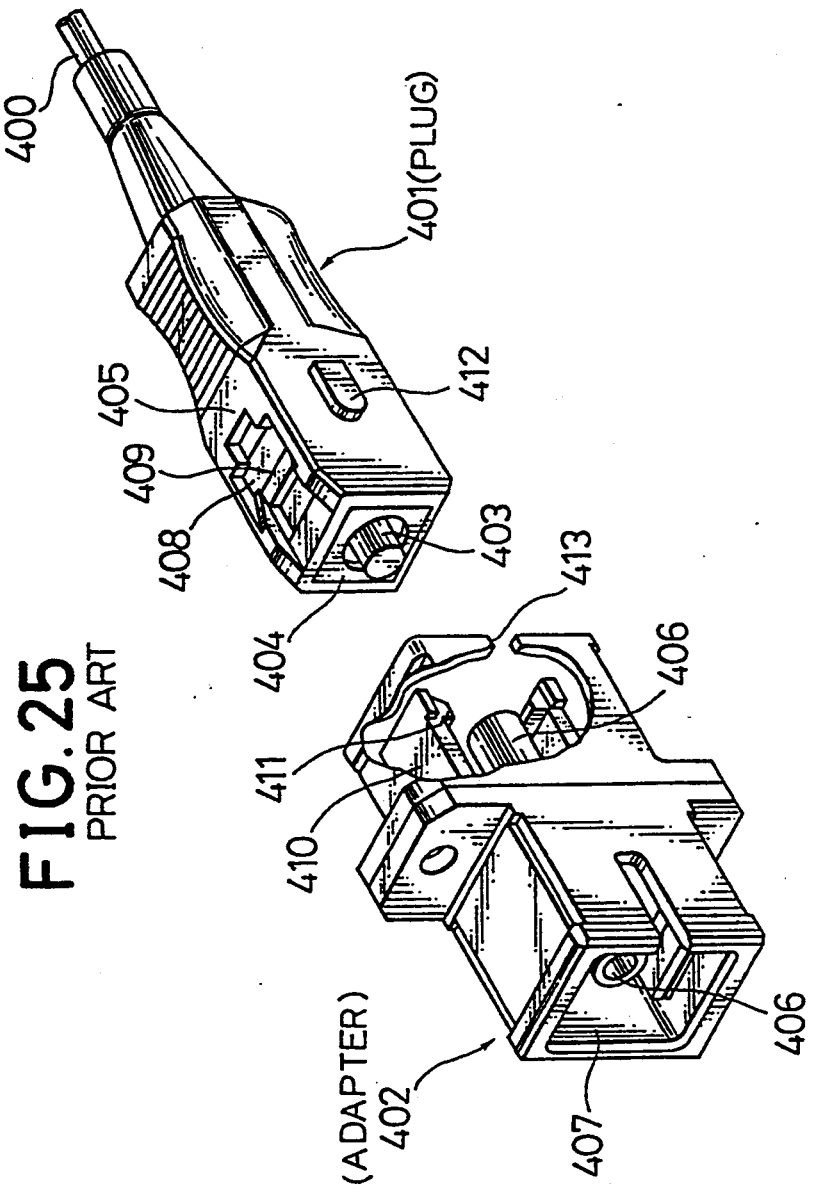
FIG. 25 is a perspective view showing a prior-art optical connector.
Figure 26A:
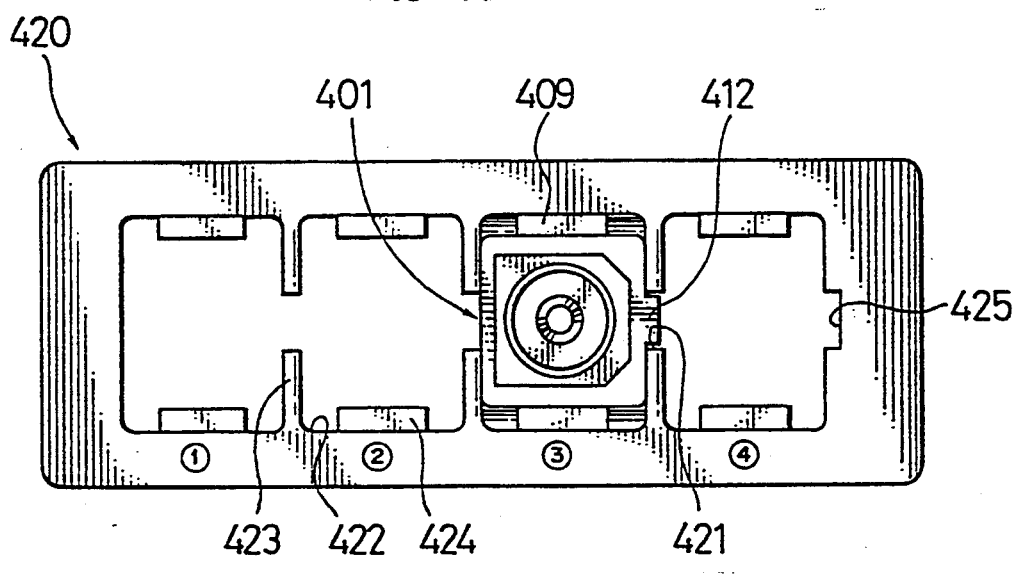
FIGS. 26(a) and 26(b) are front view for assistance in explaining the states where the prior-art optical connector plug is inserted into the connector housing.
Figure 26B:
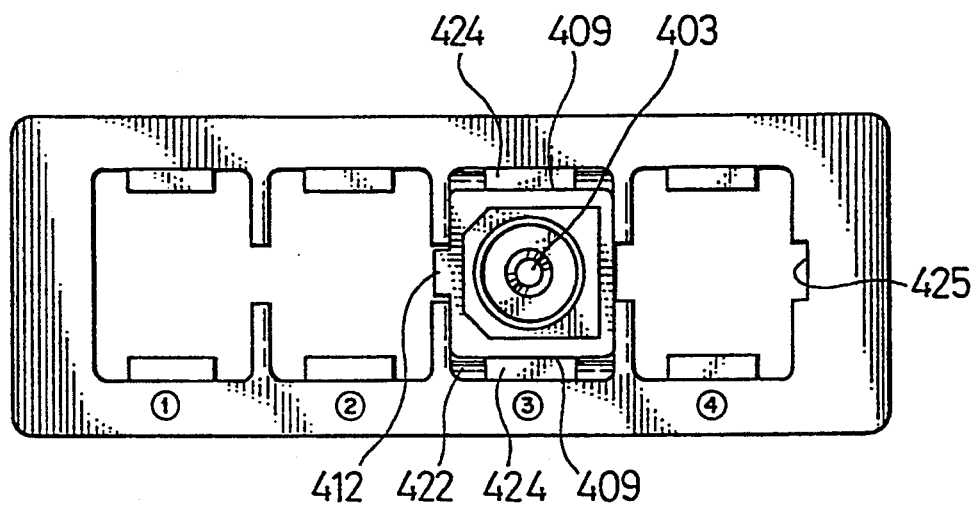
Figure 27:
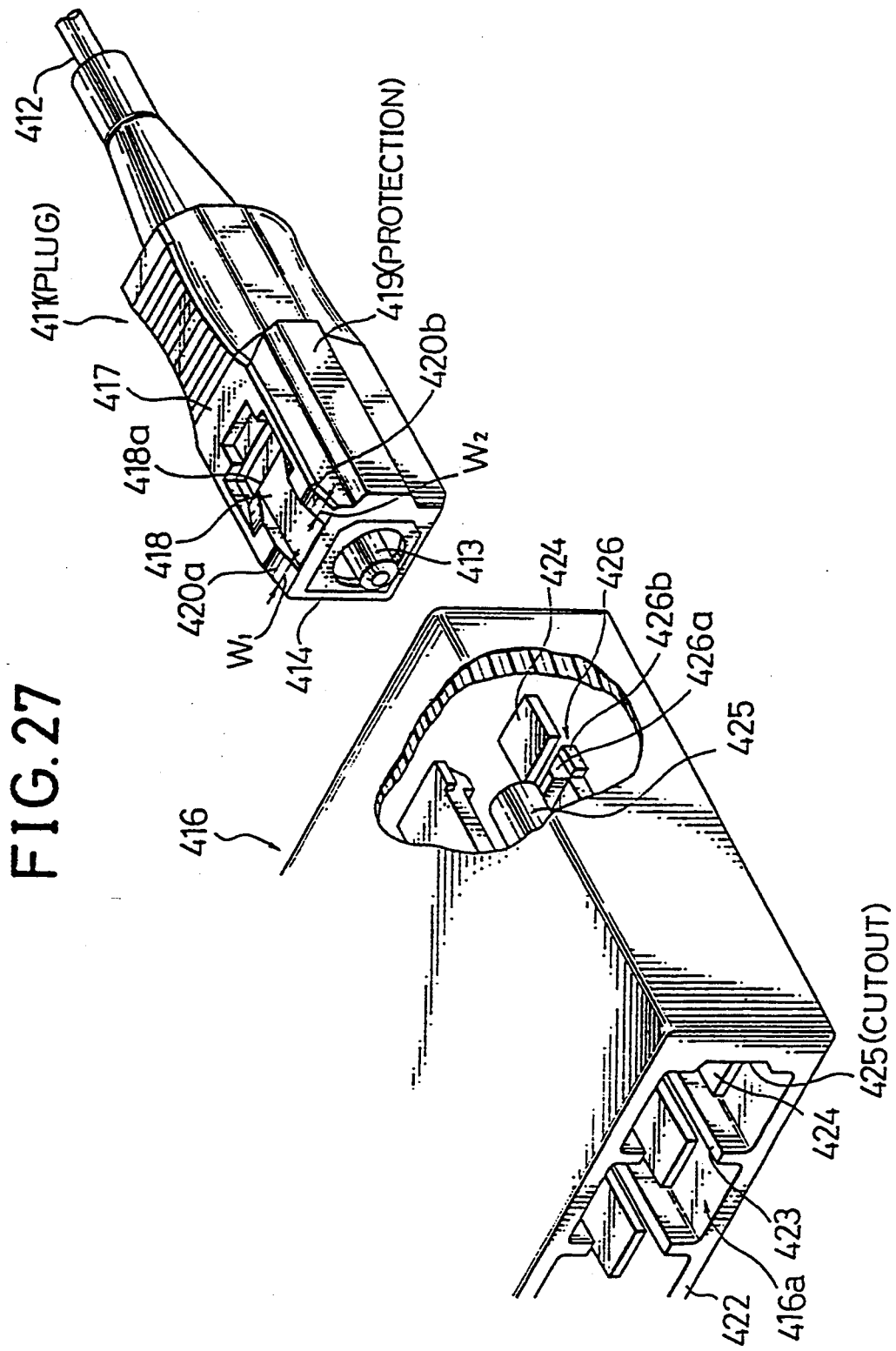
Figure 28A:
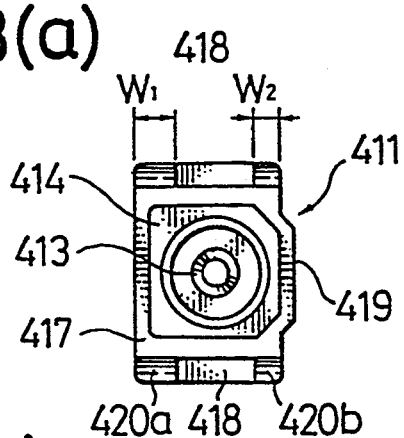
FIGS. 28(a) to 28(d) are illustrations for assistance in explaining the construction of the optical connector
Figure 28B:
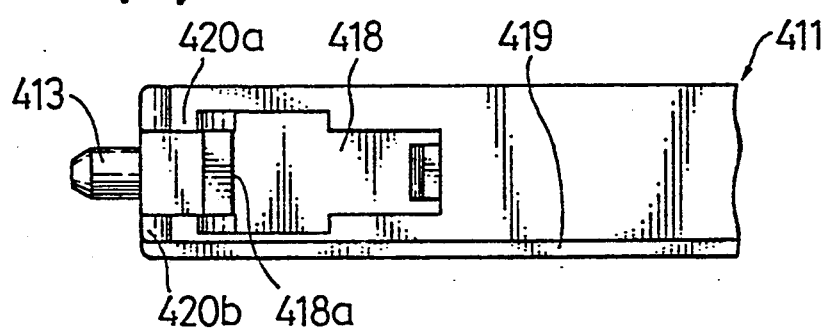
Figure 28C:
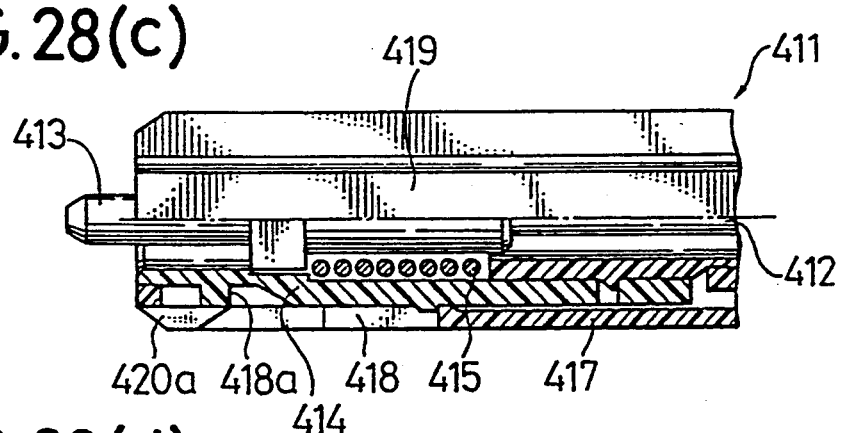
Figure 28D:
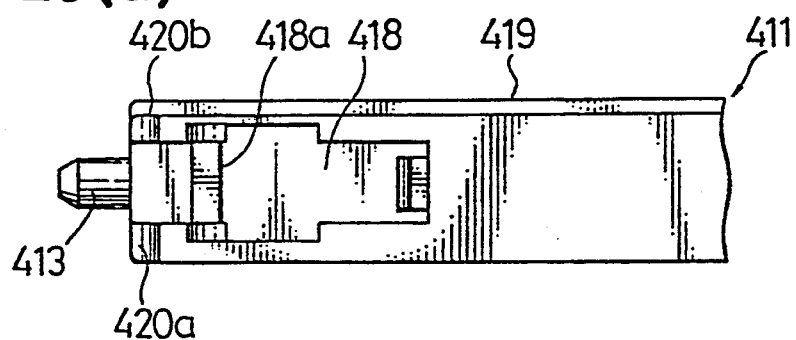
Figure 29:
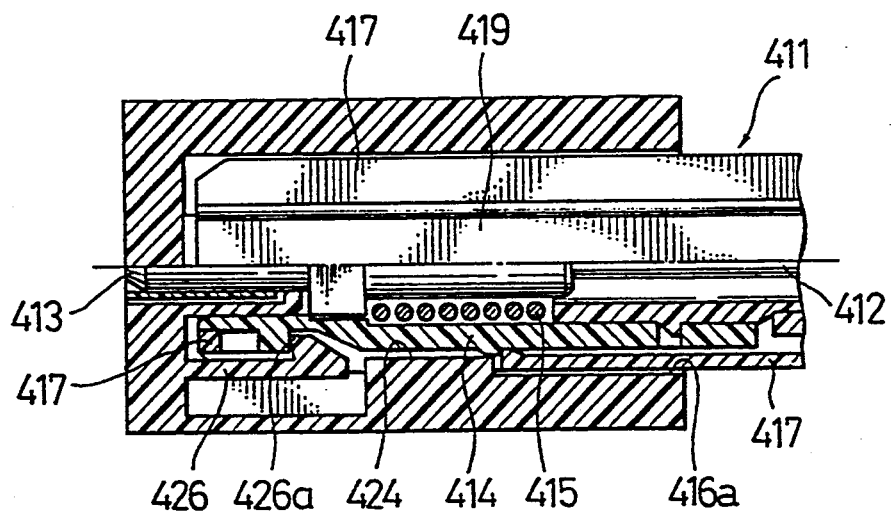
Figure 30:
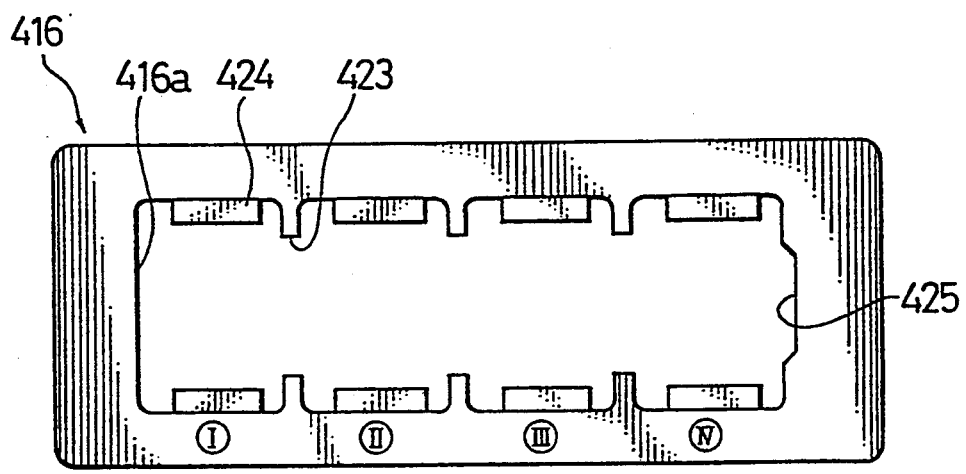
Figure 31A:
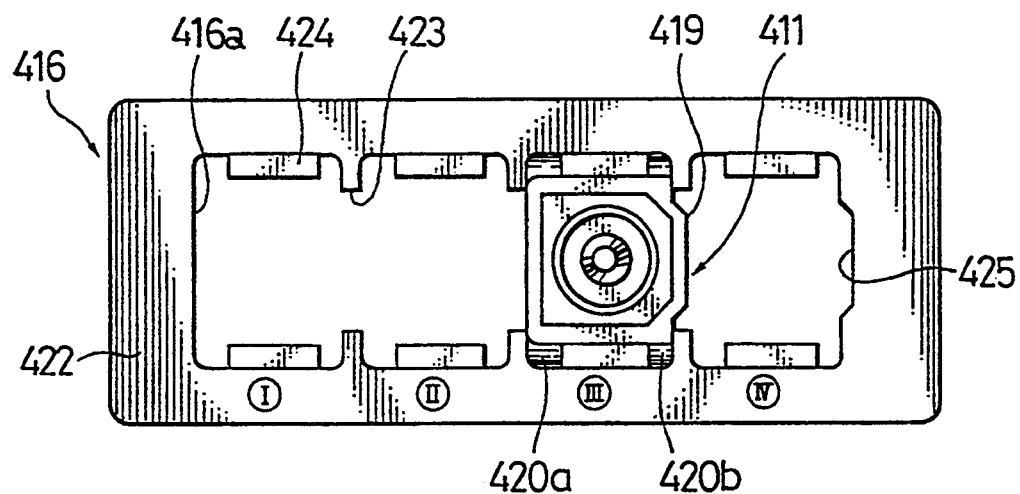
FIGS. 31(a) and 31(b) are plan views for assistance in explaining the states where the optical connector plug of the present invention is inserted into the connector housing.
Figure 31B:
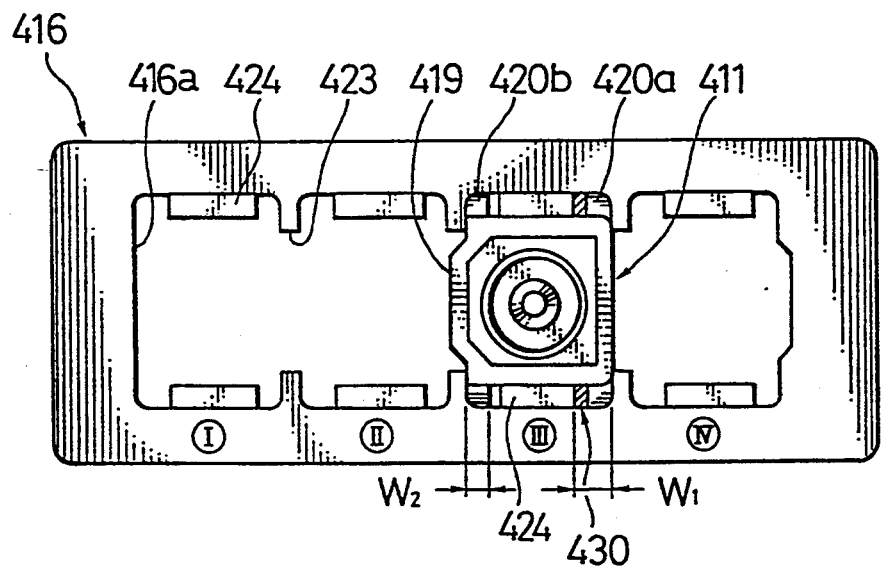
Figure 32:
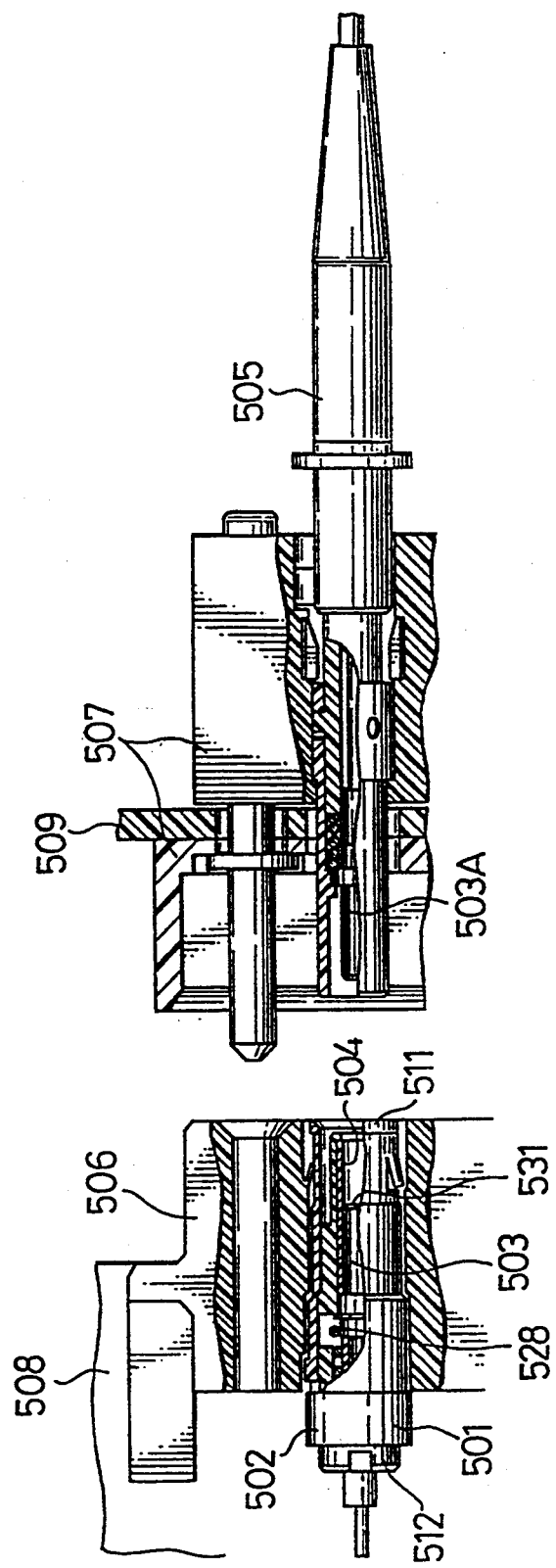
FIG. 32 is a cross-sectional view showing a prior-art plug-jack optical connector.
Figure 33A:
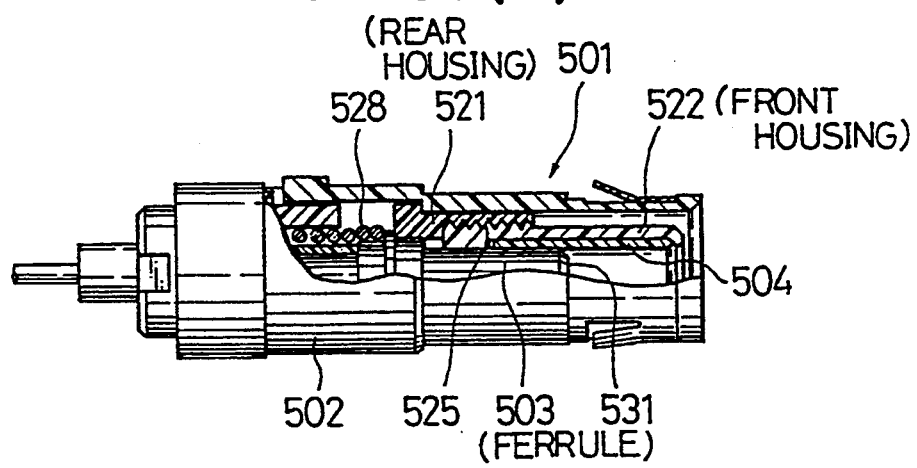
FIG. 33(a) is a cross-sectional view showing a first embodiment of the optical connector jack according to the present invention.
Figure 33C:
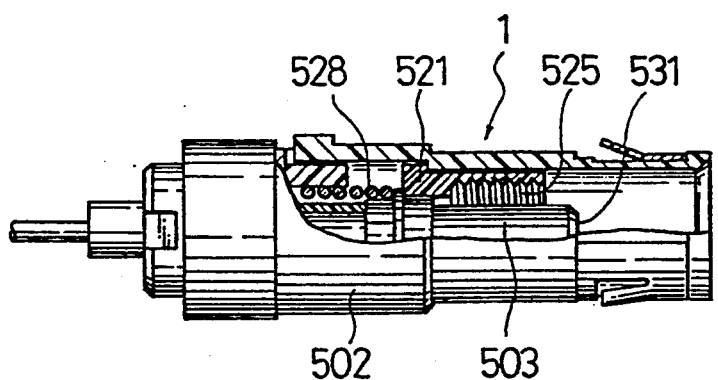
FIG. 33(c) is a cross-sectional view showing the rear housing of the optical connector jack according to the present invention.
Figure 33B:
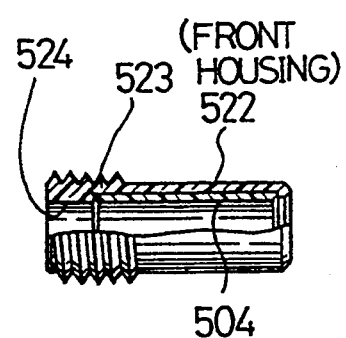
FIG. 33(b) is a cross-sectional view showing the front housing removed from the rear housing of the optical connector jack.
Figure 34A:
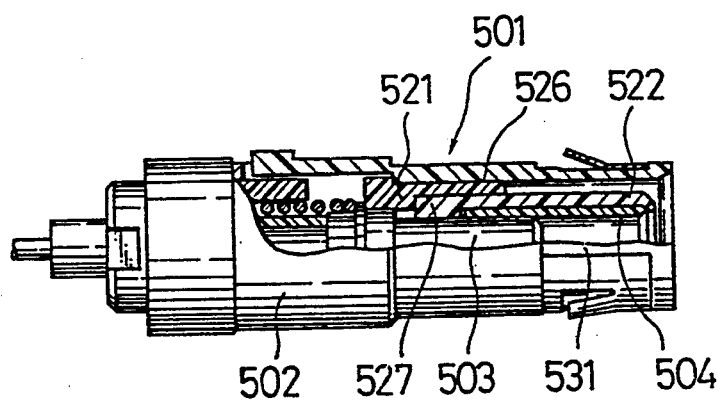
FIG. 34(a) is a partially broken cross-sectional view showing a second embodiment of the optical connector jack according to the present invention.
Figure 34B:
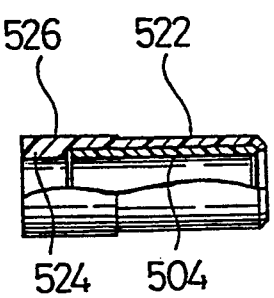
FIG. 34(b) is a cross-sectional view showing the front housing.
Figure 35:
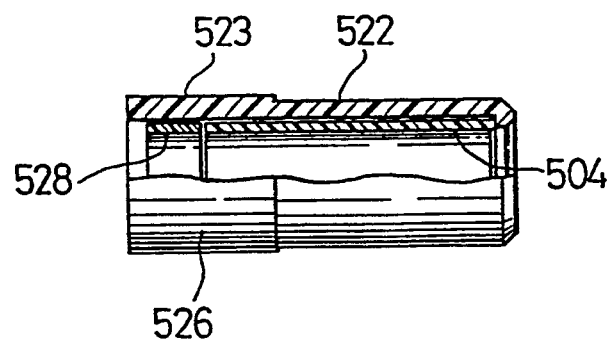
Figure 40A:
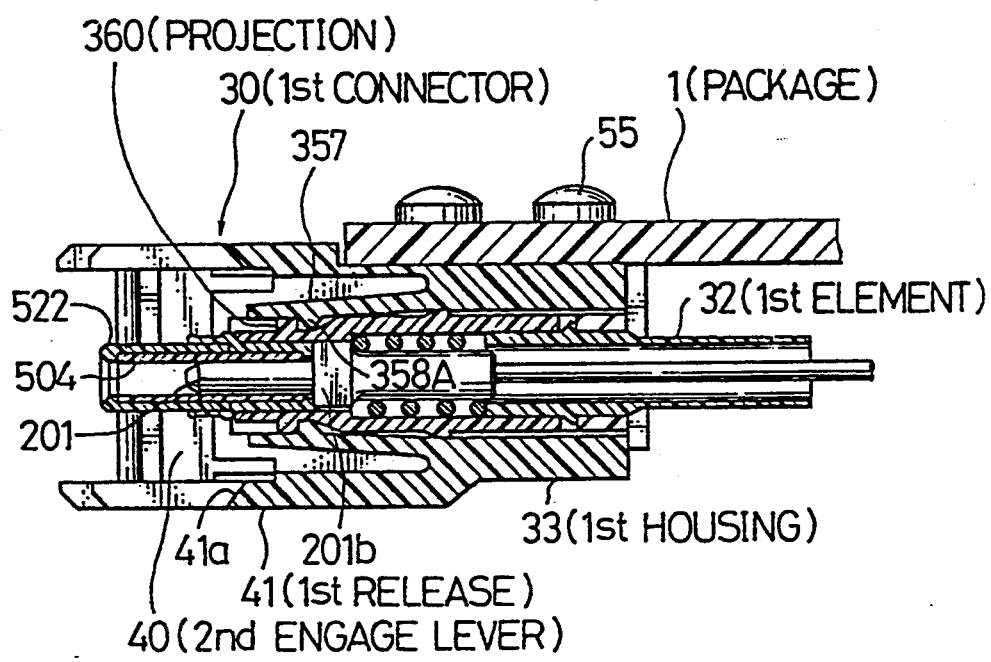
FIG. 40(a) is an enlarged transversal cross-sectional view showing the essential portions of the same optical connector.
Figure 40B:
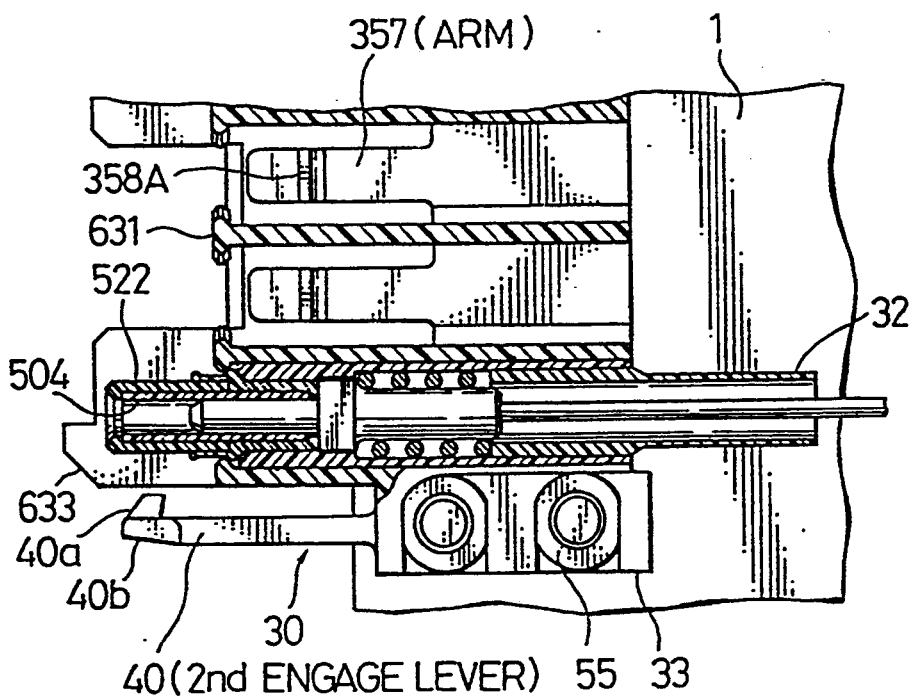
FIG. 40(b) is an enlarged longitudinal cross-sectional view showing the same optical connector.
Figure 42A:
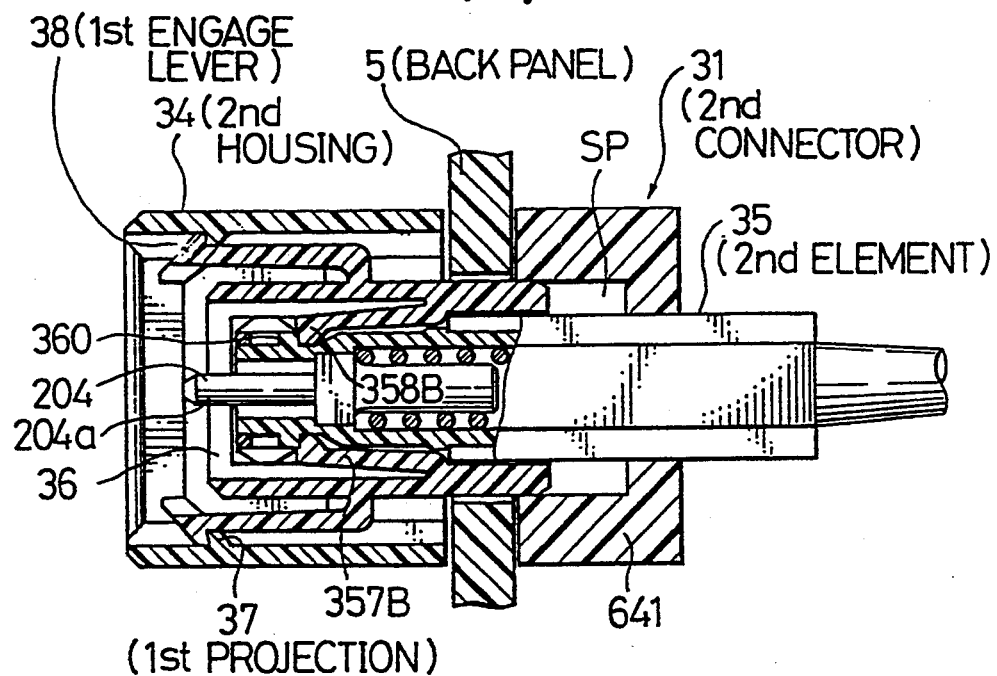
FIG. 42(a) is an enlarged transversal cross-sectional view showing the essential portions of the same optical connector.
Figure 42B:
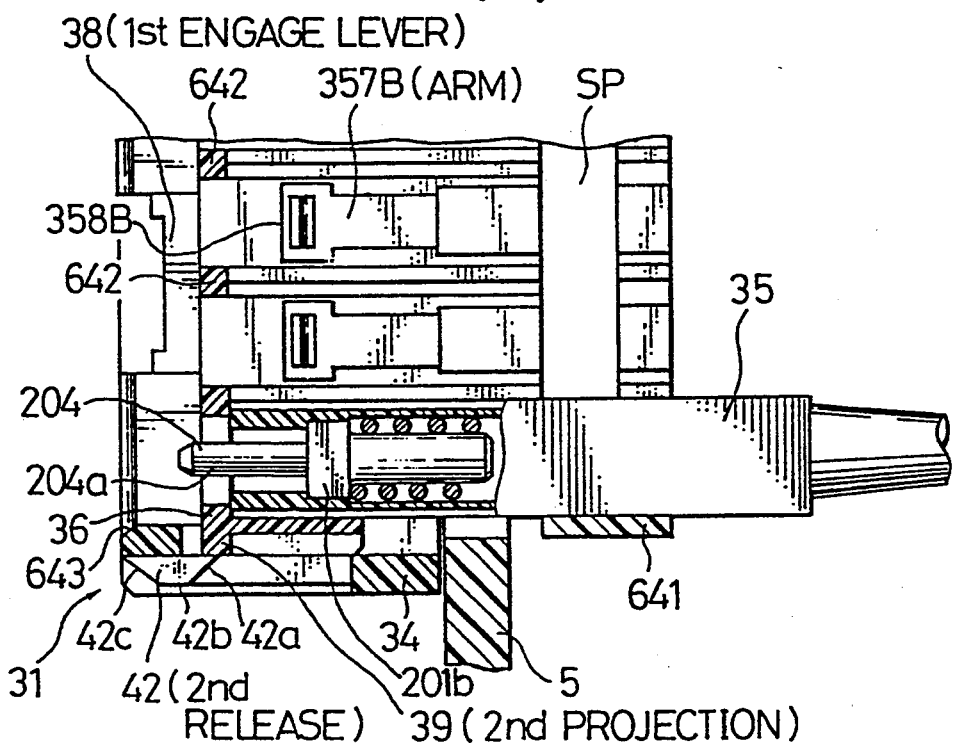
FIG. 42(b) is an enlarged longitudinal cross-sectional view showing the same optical connector.
Figure 43:
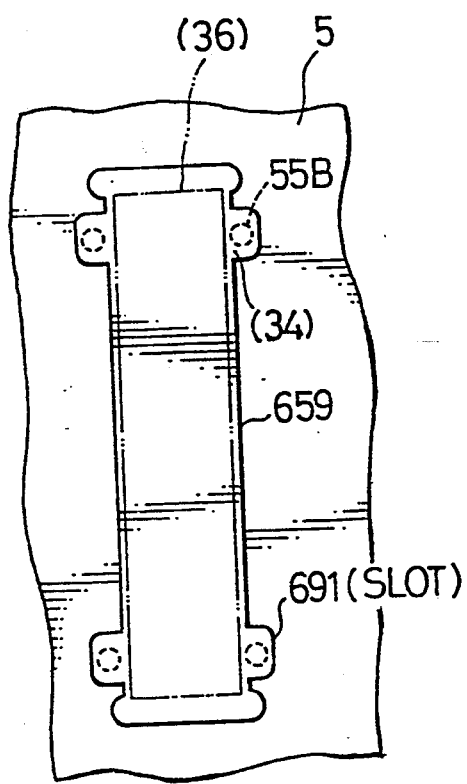
FIG. 43 is an illustration for assistance in explaining the floating structure of the second connector relative to the back panel.

What is claimed is:

1. An optical connector plug, comprising:
   (a) a plug housing (202) formed with a shoulder portion (253) between a large hollow portion (254) and a small hollow portion (252) and formed with no projection between said two portions;
   (b) a plug ferrule (201) connected to an optical fiber (204) and formed with a flange portion (201b) slidably fitted into the large hollow portion of said plug housing and an end portion (201a) passed through the small hollow portion of said plug housing; and
   (c) a spring (203) housed within said plug housing to urge the flange portion of said plug ferrule against the shoulder portion (253) of said plug housing;
   wherein said shoulder portion is shaded to accommodate axial advancement therethrough of a connector to be connected to said plug.

2. An optical connector plug, comprising:
   (a) a plug housing (202) formed with a shoulder portion (253) between a large hollow portion (254) and a small hollow portion (252) and formed with no projection between said two portions;
   (b) a plug ferrule (201) connected to an optical fiber (204) and formed with a flange portion (201b) slidably fitted into the large hollow portion of said plug housing and an end portion (201a) passed through the small hollow portion of said plug housing;
   (c) a spring (203) housed within said plug housing to urge the flange portion (201b) of said plug ferrule (201) against the shoulder portion (253) of said plug housing; and
   a mated jack ferrule (201) fitted to the small hollow portion (252) of said plug housing (202) via a sleeve holder (206) having a floating slit sleeve (205) therewithin so as to absorb an axial dimensional fitting error between the plug ferrule and the jack ferrule by axially urging the flange portion (201b) of said plug ferrule by an inner end of the sleeve holder (206) against said spring (203).

3. The optical connector plug of claim 1, wherein the large hollow portion (254) of said plug housing and the flange portion (201b) of said plug ferrule are both formed into polygonal shape.

4. The optical connector plug of claim 3, wherein the large hollow portion (254) of said plug housing and the flange portion (201b) of said plug ferrule are both formed into chamfered square shape.

* * * * *